(12) United States Patent
Gilliam et al.

(10) Patent No.: US 8,357,270 B2
(45) Date of Patent: *Jan. 22, 2013

(54) $CO_2$ UTILIZATION IN ELECTROCHEMICAL SYSTEMS

(75) Inventors: Ryan J. Gilliam, Campbell, CA (US); Thomas A. Albrecht, Mountain View, CA (US); Nikhil Jalani, Campbell, CA (US); Nigel Antony Knott, Campbell, CA (US); Valentin Decker, Menlo Park, CA (US); Michael Kostowskyj, Campbell, CA (US); Bryan Boggs, Campbell, CA (US); Alexander Gorer, Los Gatos, CA (US); Kasra Farsad, San Jose, CA (US)

(73) Assignee: Calera Corporation, Los Gatos, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 12/503,557

(22) Filed: Jul. 15, 2009

(65) Prior Publication Data

US 2010/0230293 A1 Sep. 16, 2010

Related U.S. Application Data

(63) Continuation-in-part of application No. PCT/US2009/048511, filed on Jun. 24, 2009, which is a continuation-in-part of application No. PCT/US2009/032301, filed on Jan. 28, 2009, and a (Continued)

(51) Int. Cl.
  *C25B 9/08* (2006.01)

(52) U.S. Cl. .................................. 204/263; 205/637
(58) Field of Classification Search .................. 204/263; 205/637

See application file for complete search history.

(56) References Cited

U.S. PATENT DOCUMENTS

| | | |
|---|---|---|
| 1,169,766 A | 2/1916 | Brassert |
| 1,172,930 A | 2/1916 | Brassert et al. |
| 1,176,747 A | 3/1916 | Ferguson |
| 1,493,579 A | 5/1924 | Walter |
| 1,543,942 A | 6/1925 | Mathesius |

(Continued)

FOREIGN PATENT DOCUMENTS

| | | |
|---|---|---|
| AU | 2001213118 B2 | 12/2001 |
| AU | 2007100157 | 4/2007 |

(Continued)

OTHER PUBLICATIONS

Jones, "Principles and Prevention of Corrosion" 2nd edition, pp. 50-52 (1996).*

(Continued)

*Primary Examiner* — Nicholas A. Smith
(74) *Attorney, Agent, or Firm* — Calera Corporation

(57) ABSTRACT

A low-voltage, low-energy electrochemical system and method of removing protons and/or producing a base solution comprising hydroxide and carbonate/bicarbonate ions, utilizing carbon dioxide in a cathode compartment that is partitioned into a first cathode electrolyte compartment and a second cathode electrolyte compartment such that liquid flow between the cathode electrolyte compartments is possible, but wherein gaseous communication between the cathode electrolyte compartments is restricted. Carbon dioxide gas in one cathode electrolyte compartment is utilized with the cathode electrolyte in both compartments to produce the base solution with less that 3V applied across the electrodes.

21 Claims, 7 Drawing Sheets

Related U.S. Application Data continuation-in-part of application No. PCT/US2008/088242, filed on Dec. 23, 2008.

(60) Provisional application No. 61/081,299, filed on Jul. 16, 2008, provisional application No. 61/091,729, filed on Aug. 25, 2008, provisional application No. 61/222,456, filed on Jul. 1, 2009.

U.S. PATENT DOCUMENTS

| Patent No. | | Date | Inventor |
|---|---|---|---|
| 1,655,171 | A | 1/1928 | Wagner |
| 1,678,345 | A | 7/1928 | Mattison |
| 1,759,361 | A | 5/1930 | Miller |
| 1,785,365 | A | 12/1930 | Sell |
| 1,823,269 | A | 9/1931 | Grilli |
| 1,865,833 | A | 7/1932 | Chesny |
| 1,897,725 | A | 2/1933 | Gaus et al. |
| 1,924,503 | A | 8/1933 | Lambert |
| 1,986,736 | A | 1/1935 | Mauthe et al. |
| 2,006,295 | A | 6/1935 | Chewning et al. |
| 2,054,315 | A | 9/1936 | Ebner et al. |
| 2,082,101 | A | 6/1937 | Dougherty |
| 2,204,771 | A | 6/1940 | Rice et al. |
| 2,227,465 | A | 1/1941 | Roche, Jr. et al. |
| 2,241,674 | A | 5/1941 | Mohr, Jr. et al. |
| 2,242,294 | A | 5/1941 | Fox et al. |
| 2,304,391 | A | 12/1942 | Zimmerman |
| 2,329,940 | A | 9/1943 | Ponzer |
| 2,383,674 | A | 8/1945 | Osborne |
| 2,458,039 | A | 1/1949 | Wait |
| 2,606,839 | A | 8/1952 | Evans |
| 2,810,450 | A | 10/1957 | Hartmann |
| 2,934,419 | A | 4/1960 | Cook |
| 2,967,807 | A | 1/1961 | Osborne et al. |
| 3,046,152 | A | 7/1962 | Tsuneyoshi |
| 3,120,426 | A | 2/1964 | Crawford, Jr. |
| 3,165,460 | A * | 1/1965 | Zang et al. .................. 204/634 |
| 3,179,579 | A | 4/1965 | Gustave et al. |
| 3,196,092 | A | 7/1965 | Beer |
| 3,202,522 | A | 8/1965 | Chi-Sun Yang et al. |
| 3,262,865 | A | 7/1966 | Waters, Jr. |
| 3,264,125 | A | 8/1966 | Bourlin et al. |
| 3,322,574 | A | 5/1967 | Justi et al. |
| 3,340,003 | A | 9/1967 | Judd |
| 3,350,292 | A | 10/1967 | Weinberger et al. |
| 3,374,164 | A | 3/1968 | Balej et al. |
| 3,420,775 | A | 1/1969 | Cadwallader |
| 3,463,814 | A | 8/1969 | Blanco et al. |
| 3,466,169 | A | 9/1969 | Nowak et al. |
| 3,471,999 | A | 10/1969 | Schon |
| 3,511,595 | A | 5/1970 | Fuchs |
| 3,511,712 | A | 5/1970 | Giner |
| 3,525,675 | A | 8/1970 | Gaudin |
| 3,558,769 | A | 1/1971 | Globus |
| 3,574,530 | A | 4/1971 | Suriani et al. |
| 3,627,479 | A | 12/1971 | Yee |
| 3,627,480 | A | 12/1971 | Birchall |
| 3,630,762 | A | 12/1971 | Olton et al. |
| 3,663,379 | A | 5/1972 | Kendall |
| 3,686,372 | A | 8/1972 | Hiatt et al. |
| 3,721,621 | A | 3/1973 | Hough |
| 3,725,267 | A | 4/1973 | Gelblum |
| 3,733,788 | A | 5/1973 | Crowley |
| 3,816,592 | A | 6/1974 | Rinaldi et al. |
| 3,834,129 | A | 9/1974 | Darlinger et al. |
| 3,847,632 | A | 11/1974 | Blengsli |
| 3,861,928 | A | 1/1975 | Slater et al. |
| 3,864,236 | A | 2/1975 | Lindstrom |
| 3,904,496 | A | 9/1975 | Harke et al. |
| 3,907,526 | A | 9/1975 | Saleem et al. |
| 3,917,795 | A | 11/1975 | Pelczarski et al. |
| 3,925,534 | A | 12/1975 | Singleton et al. |
| 3,953,568 | A | 4/1976 | Seko et al. |
| 3,959,419 | A | 5/1976 | Kitterman |
| 3,963,592 | A | 6/1976 | Lindstrom |
| 3,970,528 | A | 7/1976 | Zirngiebl et al. |
| 3,975,503 | A | 8/1976 | Hauschild et al. |
| 3,997,303 | A | 12/1976 | Newton |
| 4,000,991 | A | 1/1977 | Melin, Jr. et al. |
| 4,002,721 | A | 1/1977 | Guffy et al. |
| 4,026,716 | A | 5/1977 | Urschel III et al. |
| 4,036,749 | A | 7/1977 | Anderson |
| 4,045,524 | A | 8/1977 | Bornert |
| 4,069,063 | A | 1/1978 | Ball |
| 4,080,270 | A | 3/1978 | O'Leary et al. |
| 4,106,296 | A | 8/1978 | Leonard, Jr. et al. |
| 4,107,022 | A | 8/1978 | Strempel et al. |
| 4,117,060 | A | 9/1978 | Murray |
| 4,128,462 | A | 12/1978 | Ghiringhelli et al. |
| 4,140,510 | A | 2/1979 | Scholze et al. |
| 4,147,599 | A | 4/1979 | O'Leary et al. |
| 4,157,250 | A | 6/1979 | Regehr et al. |
| 4,164,537 | A | 8/1979 | Drostholm et al. |
| 4,188,291 | A | 2/1980 | Anderson |
| 4,217,186 | A | 8/1980 | McRae |
| 4,219,396 | A | 8/1980 | Gancy et al. |
| 4,242,185 | A | 12/1980 | McRae |
| 4,246,075 | A | 1/1981 | Hilbertz |
| 4,253,922 | A | 3/1981 | Welch |
| 4,263,021 | A | 4/1981 | Downs et al. |
| 4,264,367 | A | 4/1981 | Schutz |
| 4,303,549 | A | 12/1981 | Boylan |
| 4,307,066 | A | 12/1981 | Davidson |
| 4,308,298 | A | 12/1981 | Chen |
| 4,312,646 | A | 1/1982 | Fattinger et al. |
| 4,315,872 | A | 2/1982 | Senjo et al. |
| 4,335,788 | A | 6/1982 | Murphey et al. |
| 4,337,230 | A | 6/1982 | Ellestad et al. |
| 4,340,572 | A | 7/1982 | Ben-Shmuel et al. |
| 4,361,475 | A | 11/1982 | Moeglich |
| 4,363,667 | A | 12/1982 | Birchall |
| 4,370,307 | A | 1/1983 | Judd |
| 4,376,101 | A | 3/1983 | Sartori et al. |
| 4,377,554 | A | 3/1983 | Johnson |
| 4,410,606 | A | 10/1983 | Loutfy et al. |
| 4,450,009 | A | 5/1984 | Childs et al. |
| 4,477,573 | A | 10/1984 | Taufen |
| 4,508,545 | A | 4/1985 | DeLoach |
| 4,561,945 | A | 12/1985 | Coker et al. |
| 4,588,443 | A | 5/1986 | Bache |
| 4,620,969 | A | 11/1986 | Wilkinson |
| 4,634,533 | A | 1/1987 | Somerville et al. |
| 4,670,234 | A | 6/1987 | Holter et al. |
| 4,716,027 | A | 12/1987 | Morrison |
| 4,738,695 | A | 4/1988 | Carr et al. |
| 4,804,449 | A | 2/1989 | Sweeney |
| 4,818,367 | A | 4/1989 | Winkler |
| 4,838,941 | A | 6/1989 | Hill |
| 4,852,344 | A | 8/1989 | Warner |
| 4,880,447 | A | 11/1989 | Bloch |
| 4,899,544 | A | 2/1990 | Boyd |
| 4,915,877 | A | 4/1990 | Shepherd |
| 4,915,914 | A | 4/1990 | Morrison |
| 4,931,264 | A | 6/1990 | Rochelle et al. |
| 5,037,286 | A | 8/1991 | Roberts |
| 5,100,633 | A | 3/1992 | Morrison |
| 5,141,620 | A | 8/1992 | Molter |
| 5,230,734 | A | 7/1993 | Kumasaka et al. |
| 5,244,304 | A | 9/1993 | Weill et al. |
| 5,246,551 | A | 9/1993 | Pletcher et al. |
| 5,275,794 | A | 1/1994 | Luna |
| 5,282,935 | A | 2/1994 | Cawlfield et al. |
| 5,318,758 | A | 6/1994 | Fujii et al. |
| 5,362,688 | A | 11/1994 | Porta et al. |
| 5,364,611 | A | 11/1994 | Iijima et al. |
| 5,366,513 | A | 11/1994 | Goldmann et al. |
| 5,376,343 | A | 12/1994 | Fouche |
| 5,378,279 | A | 1/1995 | Conroy |
| 5,388,456 | A | 2/1995 | Kettel |
| 5,427,608 | A | 6/1995 | Auer et al. |
| 5,439,509 | A | 8/1995 | Spink et al. |
| 5,470,671 | A | 11/1995 | Fletcher et al. |
| 5,520,898 | A | 5/1996 | Pinnavaia et al. |
| 5,531,821 | A | 7/1996 | Wu |
| 5,531,865 | A | 7/1996 | Cole |
| 5,536,310 | A | 7/1996 | Brook et al. |
| 5,547,027 | A | 8/1996 | Chan et al. |

| Patent Number | Date | Inventor |
|---|---|---|
| 5,569,558 A | 10/1996 | Takeuchi et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,618,392 A | 4/1997 | Furuya |
| 5,624,493 A | 4/1997 | Wagh et al. |
| 5,690,729 A | 11/1997 | Jones, Jr. |
| 5,702,585 A | 12/1997 | Hillrichs et al. |
| 5,749,930 A | 5/1998 | Wolf et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,792,440 A | 8/1998 | Huege |
| 5,803,894 A | 9/1998 | Kao et al. |
| 5,833,736 A | 11/1998 | Durham et al. |
| 5,846,669 A | 12/1998 | Smotkin et al. |
| 5,849,075 A | 12/1998 | Hopkins et al. |
| 5,853,686 A | 12/1998 | Doxsee |
| 5,855,666 A | 1/1999 | Kao et al. |
| 5,855,759 A | 1/1999 | Keating et al. |
| 5,885,478 A | 3/1999 | Montgomery et al. |
| 5,897,704 A | 4/1999 | Baglin |
| 5,925,255 A | 7/1999 | Mukhopadhyay |
| 5,958,353 A | 9/1999 | Eyal |
| 5,965,201 A | 10/1999 | Jones, Jr. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,080,320 A | 6/2000 | von Phul |
| 6,090,197 A | 7/2000 | Vivian et al. |
| 6,129,832 A | 10/2000 | Fuhr et al. |
| 6,139,605 A | 10/2000 | Carnell et al. |
| 6,174,507 B1 | 1/2001 | Wallace et al. |
| 6,180,012 B1 | 1/2001 | Rongved |
| 6,186,426 B1 | 2/2001 | Killer |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,221,225 B1 | 4/2001 | Mani |
| 6,228,145 B1 | 5/2001 | Falk-Pedersen et al. |
| 6,235,186 B1 | 5/2001 | Tanaka et al. |
| 6,248,166 B1 | 6/2001 | Solsvik |
| 6,251,356 B1 | 6/2001 | Mathur |
| 6,264,736 B1 | 7/2001 | Knopf et al. |
| 6,264,740 B1 | 7/2001 | McNulty, Jr. |
| 6,280,505 B1 | 8/2001 | Torkildsen et al. |
| 6,293,731 B1 | 9/2001 | Studer |
| 6,309,570 B1 | 10/2001 | Fellabaum |
| 6,331,207 B1 | 12/2001 | Gebhardt |
| 6,352,576 B1 | 3/2002 | Spencer et al. |
| 6,375,825 B1 | 4/2002 | Mauldin et al. |
| 6,387,174 B2 | 5/2002 | Knopf et al. |
| 6,387,212 B1 | 5/2002 | Christian |
| 6,402,831 B1 | 6/2002 | Sawara et al. |
| 6,416,574 B1 | 7/2002 | Steelhammer et al. |
| 6,428,767 B1 | 8/2002 | Burch et al. |
| 6,444,107 B2 | 9/2002 | Hartel et al. |
| 6,447,437 B1 | 9/2002 | Lee et al. |
| 6,475,460 B1 | 11/2002 | Max |
| 6,495,013 B2 | 12/2002 | Mazur et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,602,630 B1 | 8/2003 | Gopal |
| 6,613,141 B2 | 9/2003 | Key, Jr. |
| 6,620,856 B1 | 9/2003 | Mortimer et al. |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,881,256 B2 | 4/2005 | Orange et al. |
| 6,890,419 B2 | 5/2005 | Reichman et al. |
| 6,890,497 B2 | 5/2005 | Rau et al. |
| 6,908,507 B2 | 6/2005 | Lalande et al. |
| 6,936,573 B2 | 8/2005 | Wertz et al. |
| 6,938,425 B2 | 9/2005 | Simpson et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,147,692 B2 | 12/2006 | Fornai et al. |
| 7,182,851 B2 | 2/2007 | Gomez |
| 7,198,722 B2 | 4/2007 | Hussain |
| 7,255,842 B1 | 8/2007 | Yeh et al. |
| 7,261,912 B2 | 8/2007 | Zeigler |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,459,134 B2 | 12/2008 | Cadours et al. |
| 7,541,011 B2 | 6/2009 | Hu |
| 7,595,001 B2 | 9/2009 | Arakel et al. |
| 7,597,747 B1 | 10/2009 | Nagel |
| 7,628,847 B2 | 12/2009 | Pope et al. |
| 7,674,443 B1 | 3/2010 | Davis |
| 7,704,369 B2 | 4/2010 | Olah et al. |
| 7,727,374 B2 | 6/2010 | Jones |
| 7,735,274 B2 | 6/2010 | Constantz et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,933,511 B2 | 4/2011 | Masuki |
| 7,939,336 B2 | 5/2011 | Constantz et al. |
| 7,966,250 B2 | 6/2011 | Constantz et al. |
| 7,993,500 B2 | 8/2011 | Gilliam et al. |
| 8,006,446 B2 | 8/2011 | Constantz et al. |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2002/0151017 A1 | 10/2002 | Stemmer et al. |
| 2002/0155103 A1 | 10/2002 | Crippen et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0146163 A1 | 8/2003 | Sasowsky et al. |
| 2003/0188668 A1 | 10/2003 | Bland |
| 2003/0213937 A1 | 11/2003 | Yaniv |
| 2003/0229572 A1 | 12/2003 | Raines et al. |
| 2004/0014845 A1 | 1/2004 | Takamura et al. |
| 2004/0028963 A1 | 2/2004 | Kormann et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |

| | | | | | | |
|---|---|---|---|---|---|---|
| 2004/0228788 A1 | 11/2004 | Nagai et al. | | 2008/0245672 A1 | 10/2008 | Little et al. |
| 2004/0231568 A1 | 11/2004 | Morioka et al. | | 2008/0248350 A1 | 10/2008 | Little et al. |
| 2004/0234443 A1 | 11/2004 | Chen et al. | | 2008/0270272 A1 | 10/2008 | Branscomb |
| 2004/0259231 A1 | 12/2004 | Bhattacharya | | 2008/0275149 A1 | 11/2008 | Ladely et al. |
| 2004/0267077 A1 | 12/2004 | Ding et al. | | 2008/0276553 A1 | 11/2008 | Ingjaldsdottir et al. |
| 2005/0002847 A1 | 1/2005 | Maroto-Valer et al. | | 2008/0276803 A1 | 11/2008 | Molaison et al. |
| 2005/0011770 A1 | 1/2005 | Katsuyoshi et al. | | 2008/0277319 A1 | 11/2008 | Wyrsta |
| 2005/0031515 A1 | 2/2005 | Charette | | 2008/0289495 A1 | 11/2008 | Eisenberger et al. |
| 2005/0031522 A1 | 2/2005 | Delaney et al. | | 2009/0001020 A1 | 1/2009 | Constantz et al. |
| 2005/0036932 A1 | 2/2005 | Takahashi et al. | | 2009/0010827 A1 | 1/2009 | Geerlings et al. |
| 2005/0087496 A1 | 4/2005 | Borseth | | 2009/0020044 A1 | 1/2009 | Constantz et al. |
| 2005/0098499 A1 | 5/2005 | Hussain | | 2009/0043687 A1 | 2/2009 | van Soestbergen et al. |
| 2005/0118081 A1 | 6/2005 | Harris et al. | | 2009/0078162 A1 | 3/2009 | Clausi et al. |
| 2005/0129606 A1 | 6/2005 | Mitsuhashi et al. | | 2009/0081093 A1 | 3/2009 | Comrie |
| 2005/0136310 A1 | 6/2005 | Luo et al. | | 2009/0081096 A1 | 3/2009 | Pellegrin |
| 2005/0154669 A1 | 7/2005 | Streetman | | 2009/0081112 A1 | 3/2009 | Virtanen |
| 2005/0180910 A1 | 8/2005 | Park et al. | | 2009/0090277 A1 | 4/2009 | Joshi et al. |
| 2005/0232855 A1 | 10/2005 | Stevens et al. | | 2009/0101008 A1 | 4/2009 | Lackner et al. |
| 2005/0232856 A1 | 10/2005 | Stevens et al. | | 2009/0107038 A1 | 4/2009 | Wan |
| 2005/0238563 A1 | 10/2005 | Eighmy et al. | | 2009/0120288 A1 | 5/2009 | Lackner |
| 2005/0252215 A1 | 11/2005 | Beaumont | | 2009/0120644 A1 | 5/2009 | Roddy et al. |
| 2005/0255174 A1 | 11/2005 | Shelley et al. | | 2009/0143211 A1 | 6/2009 | Riman et al. |
| 2006/0039853 A1 | 2/2006 | Fan et al. | | 2009/0148238 A1 | 6/2009 | Smith |
| 2006/0048517 A1 | 3/2006 | Fradette et al. | | 2009/0169452 A1 | 7/2009 | Constantz et al. |
| 2006/0051274 A1 | 3/2006 | Wright et al. | | 2009/0186244 A1 | 7/2009 | Mayer |
| 2006/0057036 A1 | 3/2006 | Ayala Hermosillo | | 2009/0202410 A1 | 8/2009 | Kawatra et al. |
| 2006/0060532 A1 | 3/2006 | Davis | | 2009/0214408 A1 | 8/2009 | Blake et al. |
| 2006/0093540 A1 | 5/2006 | Fan et al. | | 2009/0232861 A1 | 9/2009 | Wright et al. |
| 2006/0105082 A1 | 5/2006 | Zeigler | | 2009/0263301 A1 | 10/2009 | Reddy et al. |
| 2006/0165583 A1 | 7/2006 | Makino et al. | | 2009/0294366 A1 | 12/2009 | Wright et al. |
| 2006/0169177 A1 | 8/2006 | Jardine et al. | | 2009/0301352 A1 | 12/2009 | Constantz et al. |
| 2006/0169593 A1 | 8/2006 | Xu et al. | | 2010/0000444 A1 | 1/2010 | Constantz et al. |
| 2006/0173169 A1 | 8/2006 | Cheryan | | 2010/0024686 A1 | 2/2010 | Constantz et al. |
| 2006/0184445 A1 | 8/2006 | Sandor et al. | | 2010/0037653 A1 | 2/2010 | Enis et al. |
| 2006/0185516 A1 | 8/2006 | Moriyama et al. | | 2010/0051859 A1 | 3/2010 | House et al. |
| 2006/0185560 A1 | 8/2006 | Ramme et al. | | 2010/0063902 A1 | 3/2010 | Constantz et al. |
| 2006/0185985 A1* | 8/2006 | Jones ............................ 205/508 | | 2010/0068109 A1 | 3/2010 | Comrie |
| 2006/0186562 A1 | 8/2006 | Wright et al. | | 2010/0077691 A1 | 4/2010 | Constantz et al. |
| 2006/0189837 A1 | 8/2006 | Forrester | | 2010/0077922 A1 | 4/2010 | Constantz et al. |
| 2006/0195002 A1 | 8/2006 | Grandjean et al. | | 2010/0083880 A1 | 4/2010 | Constantz et al. |
| 2006/0196836 A1 | 9/2006 | Arakel et al. | | 2010/0084280 A1 | 4/2010 | Gilliam et al. |
| 2006/0249380 A1 | 11/2006 | Gestermann et al. | | 2010/0089142 A1 | 4/2010 | Sukhija et al. |
| 2006/0286011 A1 | 12/2006 | Anttila et al. | | 2010/0111810 A1 | 5/2010 | Constantz et al. |
| 2006/0288912 A1 | 12/2006 | Sun et al. | | 2010/0116683 A1 | 5/2010 | Gilliam |
| 2007/0045125 A1 | 3/2007 | Hartvigsen et al. | | 2010/0132556 A1 | 6/2010 | Constantz et al. |
| 2007/0056487 A1 | 3/2007 | Anthony et al. | | 2010/0132591 A1 | 6/2010 | Constantz et al. |
| 2007/0084344 A1 | 4/2007 | Moriya et al. | | 2010/0135865 A1 | 6/2010 | Constantz et al. |
| 2007/0092427 A1 | 4/2007 | Anthony et al. | | 2010/0135882 A1 | 6/2010 | Constantz et al. |
| 2007/0099038 A1 | 5/2007 | Galloway | | 2010/0140103 A1 | 6/2010 | Gilliam et al. |
| 2007/0113500 A1 | 5/2007 | Zhao | | 2010/0144521 A1 | 6/2010 | Constantz et al. |
| 2007/0148509 A1 | 6/2007 | Colbow et al. | | 2010/0150802 A1 | 6/2010 | Gilliam et al. |
| 2007/0163443 A1 | 7/2007 | Moriyama et al. | | 2010/0154679 A1 | 6/2010 | Constantz et al. |
| 2007/0184394 A1 | 8/2007 | Comrie | | 2010/0155258 A1 | 6/2010 | Kirk et al. |
| 2007/0186820 A1 | 8/2007 | O'Hearn | | 2010/0158786 A1 | 6/2010 | Constantz et al. |
| 2007/0187247 A1 | 8/2007 | Lackner et al. | | 2010/0196104 A1 | 8/2010 | Constantz et al. |
| 2007/0202032 A1 | 8/2007 | Geerlings et al. | | 2010/0200419 A1 | 8/2010 | Gilliam et al. |
| 2007/0212584 A1 | 9/2007 | Chuang | | 2010/0219373 A1 | 9/2010 | Seeker et al. |
| 2007/0217981 A1 | 9/2007 | Van Essendelft | | 2010/0224503 A1 | 9/2010 | Kirk et al. |
| 2007/0233616 A1 | 10/2007 | Richards et al. | | 2010/0229725 A1 | 9/2010 | Farsad et al. |
| 2007/0240570 A1 | 10/2007 | Jadhav et al. | | 2010/0230293 A1 | 9/2010 | Gilliam et al. |
| 2007/0251393 A1 | 11/2007 | Pope et al. | | 2010/0230830 A1 | 9/2010 | Farsad et al. |
| 2007/0261947 A1 | 11/2007 | Geerlings et al. | | 2010/0236242 A1 | 9/2010 | Farsad et al. |
| 2007/0266632 A1 | 11/2007 | Tsangaris et al. | | 2010/0239467 A1 | 9/2010 | Constantz et al. |
| 2008/0031801 A1 | 2/2008 | Lackner et al. | | 2010/0239487 A1 | 9/2010 | Constantz et al. |
| 2008/0035036 A1 | 2/2008 | Bassani et al. | | 2010/0247410 A1 | 9/2010 | Constantz et al. |
| 2008/0059206 A1 | 3/2008 | Jenkins | | 2010/0258035 A1 | 10/2010 | Constantz et al. |
| 2008/0099122 A1 | 5/2008 | Andersen et al. | | 2010/0276299 A1 | 11/2010 | Kelly et al. |
| 2008/0104858 A1 | 5/2008 | Carin et al. | | 2010/0290967 A1 | 11/2010 | Detournay et al. |
| 2008/0112868 A1 | 5/2008 | Blencoe et al. | | 2010/0313793 A1 | 12/2010 | Constantz et al. |
| 2008/0134891 A1 | 6/2008 | Jarvenpaa | | 2010/0313794 A1 | 12/2010 | Constantz et al. |
| 2008/0138265 A1 | 6/2008 | Lackner et al. | | 2010/0319586 A1 | 12/2010 | Blount et al. |
| 2008/0171158 A1 | 7/2008 | Maddan | | 2010/0326328 A1 | 12/2010 | Constantz et al. |
| 2008/0178739 A1 | 7/2008 | Lewnard et al. | | 2011/0030586 A1 | 2/2011 | Constantz et al. |
| 2008/0213146 A1 | 9/2008 | Zauderer | | 2011/0030957 A1 | 2/2011 | Constantz et al. |
| 2008/0223727 A1 | 9/2008 | Oloman et al. | | 2011/0033239 A1 | 2/2011 | Constantz et al. |
| 2008/0233029 A1 | 9/2008 | Fan et al. | | 2011/0035154 A1 | 2/2011 | Kendall et al. |
| 2008/0236143 A1 | 10/2008 | Lo | | 2011/0036728 A1 | 2/2011 | Farsad |
| 2008/0245274 A1 | 10/2008 | Ramme | | 2011/0042230 A1 | 2/2011 | Gilliam et al. |
| 2008/0245660 A1 | 10/2008 | Little et al. | | 2011/0054084 A1 | 3/2011 | Constantz et al. |

| | | | |
|---|---|---|---|
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |

FOREIGN PATENT DOCUMENTS

| | | |
|---|---|---|
| AU | 2007201171 A1 | 10/2007 |
| AU | 2007101174 A4 | 1/2008 |
| AU | 2008256636 B2 | 12/2008 |
| AU | 2008101140 A4 | 1/2009 |
| CA | 1303822 C | 6/1988 |
| CA | 1335974 A1 | 6/1995 |
| CA | 2308224 C | 4/1999 |
| CA | 2255287 A1 | 6/2000 |
| CA | 2353830 A1 | 6/2000 |
| CA | 2440325 A1 | 1/2003 |
| CA | 2646462 | 9/2007 |
| CA | 2617325 A1 | 11/2007 |
| CA | 2682952 A1 | 10/2008 |
| CA | 2659447 A1 | 12/2008 |
| CN | 101219330 A | 7/2008 |
| CN | 101289200 A | 10/2008 |
| DE | 2653649 A1 | 6/1978 |
| DE | 3146326 A1 | 6/1983 |
| DE | 3638317 A1 | 1/1986 |
| DE | 19523324 A1 | 9/1994 |
| DE | 19512163 A1 | 10/1995 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 9/1999 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| EP | 2253600 A1 | 11/2010 |
| GB | 911386 A | 11/1962 |
| GB | 1392907 | 5/1975 |
| GB | 2032441 | 5/1980 |
| GB | 2050325 A | 1/1981 |
| GB | 2208163 A | 3/1989 |
| GB | 2210035 A | 6/1989 |
| GB | 2371810 | 8/2002 |
| JP | 51102357 A1 | 9/1976 |
| JP | 59100280 | 12/1982 |
| JP | 1142093 | 11/1987 |
| JP | 63-312988 | 12/1988 |
| JP | 03-020491 | 1/1991 |
| JP | 03-170363 A | 7/1991 |
| JP | 04-317721 A | 11/1992 |
| JP | 7061842 A | 3/1995 |
| JP | 10287461 A | 10/1998 |
| JP | 10305212 A | 11/1998 |
| JP | 2000226402 A | 8/2000 |
| JP | 03184892 B2 | 7/2001 |
| JP | 2003041388 | 7/2001 |
| JP | 2002-273163 A | 9/2002 |
| JP | 2004-174370 | 6/2004 |
| JP | 2005-052762 | 3/2005 |
| JP | 2006-076825 | 3/2006 |
| JP | 2009279530 A | 12/2009 |
| NL | 7607470 A | 1/1978 |
| SU | 1819854 A1 | 6/1993 |
| WO | WO 93/16216 A1 | 8/1993 |
| WO | WO 94/18119 | 8/1994 |
| WO | WO 96/34997 A1 | 11/1996 |
| WO | WO 99/13967 A1 | 3/1999 |
| WO | WO 01/07365 A1 | 2/2001 |
| WO | WO 01/96243 A1 | 12/2001 |
| WO | WO 02/00551 A2 | 1/2002 |
| WO | WO 02/085788 A1 | 10/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/009600 A2 | 1/2006 |
| WO | WO 2006/034339 A1 | 3/2006 |
| WO | WO 2006/036396 A2 | 4/2006 |
| WO | WO 2006/099599 A2 | 9/2006 |
| WO | WO 2006/113997 A1 | 11/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/022595 A2 | 3/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |

| | | | |
|---|---|---|---|
| WO | WO 2010/132863 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |

OTHER PUBLICATIONS

Allen, L.M. 1992. Boron and Sulfur Isotopic Fractionation in the Coal Combustion System. A Thesis Submitted to the Faculty of the Department of Hydrology and Water Resources. The University of Arizona.

Baer, D.S., et al. 2002. Sensitive absorption measurements in the near-infrared region using off-axis integrated-cavity-output spectroscopy. *Appl. Phys. B*. 5 pages.

Biello, D. Cement from CO2: A Concrete Cure for Global Warming? *Scientific American* Aug. 7, 2008., pp. 1-3 [online] [retrieved on Dec. 29, 2009] <URL:http://www.scientificamerican.com/article.cfm>.

Biennier, L., et al. 2004. Multiplex integrated cavity output spectroscopy of cold PAH cations. *Chemical Physics Letters*. 387: 287-294.

Bottomley, D.J. et al. 1999. The origin and evolution of Canadian Shield brines: evaporation or freezing of seawater? New lithium isotope and geochemical evidence from the Slave craton. *Chemical Geology*. 155: 295-320.

Carbon Sequestration. National Energy Technology Laboratory, Jul. 1, 2008 (online) [retrieved on Dec. 21, 2009] <URL:http://web.archive.org/web/20080701213124/http://www.netl.doe.gov/technologies/carbon_seq/index.html>.

Cerling, T.E. 1984. The stable isotopic composition of modern soil carbonate and its relationship to climate. *Earth and Planetary Science Letters*. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL:http://pubs.acs.org/doi/abs/10.1021/ac071040p>.

Criss, R.E. 1995. Stable Isotope Distribution: Variations from Temperature, Organic and Water-Rock Interactions. Washington University, St. Louis, Department of Earch and Planetary Sciences. *American Geophysical Union*. pp. 292-307.

Ehleringer, J.R., et al. 2002. Stable Isotopes. Volume 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.

Fallick, A.E., et al. 1991. A Stable Isotope Study of the Magnesite Deposits Associated with the Alpine-Type Ultramafic Rocks of Yugoslavia. *Economic Geology*. 86: 847-861.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research*. 70(3): 565-585.

Holdgate, G.R., et al. 2009. Eocene-Miocene carbon-isotope and floral record from brown coal seams in the Gippsland Basin of southeast Australia. *Global and Planetary Change*. 65: 89-103.

Horkel, K., et al. 2009. Stable isotopic composition of cryptocrystalline magnesite from deposits in Turkey and Austria. *Geophysical Research Abstracts*. 11. (abstract only).

Horner, G. et al. 2004. Isotope selective analysis of CO2 with tunable diode laser (TDL) spectroscopy in the NIR. *The Analyst*. 129: 772-778.

Huijgen, W.J.J., et al. 2005. Mineral CO2 Sequestration by Steel Slag Carbonation. *Environ. Sci. Technol*. 39: 9676-9682.

Huijgen, W.J.J., et al. 2006. Energy Consumption and Net CO2 Sequestration of Aqueous Mineral Carbonation. *Ind. Eng. Chem. Res*. 45: 9184-9194.

Huntzinger, D.N. et al. 2009. A life-cycle assessment of Portland cement manufacturing: comparing the traditional process with alternative technologies. *Journal of Cleaner Production*. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.

International Search Report dated Mar. 3, 2010 of EP08867440.3.
International Search Report dated Jan. 4, 2010 of PCT/US09/062795.
International Search Report dated Jan. 13, 2010 of PCT/US09/059135.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.

"Isotopic Signature", Wikipedia (2010), http://en.wikipedia.org/wiki/Isotopic_signature, April144, 2009, 3 pp.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

McCrea, J.M. 1950. On the Isotopic Chemistry of Carbonates and a Paleotemperature Scale. *The Journal of Chemical Physics*. 18(6): 849-857.

Melezhik, V.A., et al. 2001. Palaeoproterozoic magnesite: lithological and isotopic evidence for playa/sabkha environments. *Sedimentology*. 48: 379-397.

Mihalcea, R.M., et al. 1998. Diode-laser absorption measurements of CO2 near 2.0 μm at elevated temperatures. *Applied Optics*. 37(36): 8341-8347.

Miljevic, N., et al. 2007. Potential Use of Environmental Isotopes in Pollutant Migration Studies. *Environmental Isotopes in Pollutant Studies*. 58: 251-262.

Mook, W.G., et al. 1968. Isotopic Equilibrium between Shells and Their Environment. *Science*. 159(3817): 874-875.

Mook, W.G., et al. 1974. Carbon Isotope Fractionation Between Dissolved Bicarbonate and Gaseous Carbon Dioxide. 22:169-176.

O'Neil, J.R., et al. 1971. C13 and O18 compositions in some freshwater carbonates associated with ultramafic rocks and serpentines: western United States*. *Geochimica et Cosmochimica Acta*. 35: 687-697.

Philp, R.P. 2007. The emergence of stable isotopes in environmental and forensic geochemistry studies: a review. *Environ Chem Lett*. 5:57-66.

Power, I.M., et al. 2007. Biologically induced mineralization of dypingite by cyanobacteria from an alkaline wetland near Atlin, British Columbia, Canada. *Geochemical Transactions*. 8: 16 pages.

Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts*. 11. (abstract only).

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL:http://www.agu.org/pubs/crossref/2008/2007JC004217.shtml>.

Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.

Schroll, E. 2002. Genesis of magnesite deposits in the view of isotope geochemistry. *Boletim Paranaense de Geociencias*. 50: 59-68.

Sheppard, S.M.F., et al. 1970. Fractionation of Carbon and Oxygen Isotopes and Magnesium between Coexisting Metamorphic Calcite and Dolomite. *Contr. Mineral. And Petrol.* 26. 161-198.

Sethi, S. et al. 2006. Existing & Emerging Concentrate Minimization & Disposal Practices for Membrane Systems. *Florida Water Resources Journal*. pp. 38, 40, 42, 44, 46, 48.

Sial, A.N., et al. 2000. Carbon isotope fluctuations in Precambrian carbonate sequences of several localities in Brazil. *An. Acad. Bras. Ci.* 72(4): 539-558.

Stanley, S.M., et al. 2002. Low-magnesium calcite produced by corallin algae in seawater of Late Cretaceous composition. *PNAS.* 99(24): 15323-15326.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/344,019, filed Dec. 24, 2008, Constantz, Brent R., et al, Non-Final Office Action dated Nov. 16, 2009.

U.S. Appl. No. 12/344,019, filed Dec. 24, 2008, Constantz, Brent R., et al, Non-Final Office Action dated Mar. 11, 2010.

U.S. Appl. No. 12/375,632, filed Mar. 5, 2009, Kirk, Donald W. et al, Non-Final Office Action dated Mar. 19, 2010.

U.S. Appl. No. 12/475,378, filed May 29, 2009, Constantz Brent. et al, Non-Final Office Action dated Mar. 17, 2010.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Non-Final Office Action dated Mar. 23, 2010.

U.S. Appl. No. 12/486,692, filed Jun. 17, 2009, Constantz Brent. et al, Non-Final Office Action dated Mar. 1, 2010.

U.S. Appl. No. 12/501,217, filed Jul. 10, 2009, Constantz Brent. et al, Non-Final Office Action dated Mar. 12, 2010.

U.S. Appl. No. 12/604,383, filed Oct. 22 2009, Constantz Brent R. et al, Non-Final Office Action dated Apr. 5, 2010.

U.S. Appl. No. 12/609,491, filed Oct. 30, 2009, Constantz Brent. et al, Non-Final Office Action dated Mar. 31, 2010.

Vagin, S.P., et al. 1979. Measurement of the Temperature of Gas Media Containing Carbon Dioxide by the Laser-Probing Method. *Plenum*.

Wang, W., et al. 2005. Effects of biodegradation on the carbon isotopic composition of natural gas—A case study in the bamianhe oil field of the Jiyang Depression, Eastern China. *Geochemical Journal.* 39(4): 301-309. (abstract) [online] [retrieved on Dec. 29, 2009] <URL:http://www/jstage.jst.go.jp/article/geochemj/39/4/39_301/_article> ab.

Webber, M.E., et al. 2001. In situ combustion measurements of CO2 by use of a distributed-feedback diode-laser sensor near 2.0 μm. *Applied Optics.* 40(6): 821-828.

Wen-Zhi et al., "Using Electrolytic Method to Promote CO2 Sequestration in Serpentine by Mineral Carbonation"; Journal of China University of Mining and Technology; vol. 36, No. 6; Nov. (2007) (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc.* 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL:http://www.anl.gov/PCS/acsfuel/preprint%20archive/Files/33_1_TORONTO_06-88_0114.PDF>.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

U.S. Appl. No. 60/921,598, filed Apr. 3, 2007, Little et al.

Avery, G.B. et al. 2006. Carbon isotopic characterization of dissolved organic carbon in rainwater: Terrestrial and marine influences. *Science Direct.* 40(39): 7539-7545. Retrieved from the internet on May 20, 2010.

Dickens, A. et al. 2004. Reburial of fossil organic carbon in marine sediments. *Nature.* 427: 336-339. Retrieved from the internet on May 20, 2010.

Faure, et al. 1963. The Isotopic Composition of Strontium in Oceanic and Continental Basalts: Application to the Origin of Igneous Rocks. *Journal of Petrology.* 4(1): 31-50. (abstract only). Http://petrology.oxfordjournals.org/cgi/content/abstract/4/1/31 (retrieved on Jun. 1, 2010).

Huijgen, W.J.J., et al. 2003. Carbon dioxide sequestration by mineral carbonation. ECN-C-03-016; Energy Research Centre of the Netherlands: Petten; pp. 1-42.

International Search Report dated May 6, 2010 of EP09716193.9.
International Search Report dated Jun. 22, 2010 of EP08772151.0.
International Search Report dated Jul. 7, 2010 of PCT/US10/026880.
International Search Report dated Jul. 9, 2010 of PCT/US10/025970.
International Search Report dated May 21, 2010 of PCT/US09/064117.

Mottana, A. et al. 1979. Der grosse Mineralienfuhrer, BLV Verlagsgesel lschaft mbH, Munchen, XP002577921, p. 194. (in German with English Translation).

Noda, H., et al. 1990. Electrochemical Reduction of Carbon Dioxide at Various Metal Electrodes in Aqueous Potassium Hydrogen Carbonate Solution. *The Chemical Society of Japan.* 63: 2459-2462.

Portier et al. 2005. Modelling CO2 solubility in pure water and NaCl-type waters from 0 to 300° C and from 1 to 300 bar Application to the Utsira Formation at Sleipner. *Chemical Geology.* 217: 187-199.

Quay, P.D., et al. 1992. Oceanic Uptake of Fossil Fuel CO$_2$: Carbon- 13 Evidence. *Science.* 256 (5053): 74-79.

Schwab, E. 2004. Calciumhydroxid, XP-002577920. Retrieved from the Internet: <URL:http://www.roempp.com/prod/index1.html> (in German with English Translation).

U.S. Appl. No. 12/344,019, filed Dec. 24, 2008, Constantz, Brent R., et al, Non-Final Office Action dated Jul. 14, 2010.

U.S. Appl. No. 12/475,378, filed May 29, 2009, Constantz Brent. et al, Final Office Action dated May 5, 2010.

U.S. Appl. No. 12/486,692, filed Jun. 17, 2009, Constantz Brent. et al, Final Office Action dated May 3, 2010.

U.S. Appl. No. 12/557,492, filed Sep. 10, 2009, Constantz, Brent R., et al. Non-Final Office Action dated May 6, 2010.

U.S. Appl. No. 12/604,383, filed Oct. 22 2009, Constantz Brent R. et al, Final Office Action dated Jun. 11, 2010.

U.S. Appl. No. 12/571,398, filed Sep. 30, 2009, Constantz Brent R. et al, Non-Final Office Action dated May 3, 2010.

U.S. Appl. No. 12/609,491, filed Oct. 30, 2009, Constantz Brent. et al, Final Office Action dated Jul. 16, 2010.

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 (2007) 273-281.

Berg et al., "A 3-Hydroxyproprionate/ 4-Hydroxybutyrate Autotrophic Carbon Dioxide Assimilation Pathway in Archea"; Science Dec. 14, 2007; vol. 318, No. 5857 DOI 10.1126/science 1149976; pp. 1782-1786.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

CICCS "Aims and Research"; www.nottingham.ac.uk/carbonmanagement/ccs_aims.php 2pp Aug. 3, 2007.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. *Journal of Membrane Science* 284 (1-2): 323-330.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.

Holze, S. et al. 1994. Hydrogen Consuming Anodes for Energy Saving in Sodium Sulphate Electrolysis. *Chem. Eng. Technol.* 17: 382-389.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

International Search Report dated Feb. 19, 2009 of PCT/US08/88242.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Mazrou, S., et al. 1997. Sodium hydroxide and hydrochloric acid generation from sodium chloride and rock salt by electroelectrodialysis. *Journal of Applied Electrochemistry* 27: 558-567.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12pp.

Park, A., et al. 2004. CO2 mineral sequestration: physically activated dissolution of serpentine and pH swing process. *Chemical Engineering Science* 59 (22-23): 5241-5247.

Rau, G. 2004. Possible use of Fe/CO2 fuel cells for CO2 mitigation plus H2 and electricity production. *Energy Conversion and Management.* 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html'ref=todayspaper; 4pp.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); www.shellglobalsoultions.com 2 pp.

Tececo Pty Ltd, "Eco-Cement"; www.tececo.com/simple.eco-cement.php; Dec. 29, 2008; 6pp.

"Biomass Burning: A Hot Issue in Global Change." National Aeronautics and Space Administration. Langley Research Center, Hampton, Virginia Fact Sheet FS-2001-02-56-LaRC. Feb. 2001. 4 pages.

Cannell, M.G.R. 2003. "Carbon sequestration and biomass energy offset: theoretical, potential and achievable capacities globally, in Europe and the UK." Biomass and Bioenergy. 24: 97-116.

Levy, D. "Burnt biomass causes short-term global cooling, long-term warming." http://news-service.stanford.edn/news/2004/august4/biomass-84.html. 3 pages.

Turner, J.A. 1999. "A Realizable Renewable Energy Future." Science. 285 (5428): 687-689.

Wright, L.L., et al. 1993. "U.S. Carbon Offset Potential Using Biomass Energy Systems." Water, Air, and Soil Pollution. 70: 483-497.

Back, M. et al.,"Reactivity of Alkaline Lignite Fly Ashes Towards CO in Water." Environmental Science & Technology. vol. 42, No. 12 (2008) pp. 4520-4526.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Lackner, K.S. et al. "Carbon Dioxide Disposal in Carbonate Minerals." Energy. 1995. 20(11): 1153-1170.

Montes-Hernandez, G. et al.,"Mineral sequestration of CO2 by aqueous carbonation of coal combustion fly-ash." Journal of Hazardous Materials vol. 161 (2009). pp. 1347-1354.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Sadhwani et al., "Case Studies on environmental impact of seawater desalination" Science Direct; http://www.sciencedirect.com/science?_ob=ArticleURL&_udi=B6TFX-4HMX97J-3&_u . . . 3pp.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/375,632, filed Mar. 5, 2009, Kirk, Donald W. et al, Non-Final Office Action dated Sep. 8, 2009.

"Electrochemical cell", Wikipedia (2009), http:en.wikipedia.org/wiki/Electrochemical_Cell, Nov. 24, 2009, 5 pp.

International Search Report dated Dec. 14, 2009 of PCT/US09/061748.

Bauer, C.F., et al. 1981. Identification and Quantitation of Carbonate Compounds in Coal Fly Ash. *American Chemical Society.* 15(7): 783-788.

Bommaraju, T.V. et al. 2001. Brine Electrolysis. <http://electrochem.cwru.edu/encycl/art-b01-brine.htm>. Retrieved on Oct. 6, 2010. pp. 1-25.

Eurodia. Bipolar Membrane Electrodialysis. Available online as of 2001.; visited Oct. 6, 2010 at http://www.eurodia.com/html/eb.html.

Gillery et al. Bipolar membrane electrodialysis: the time has fmally come! Presented 16th Intl. Forum on Appl. Electrochem; Cleaner Tech.-Challenges and Solutions. Nov. 10-14, 2002. Amelia Island Plantation, FL. 4 pages. Retrieved form the Internet on Aug. 14, 2009. http://www.ameridia.com/html/ebc.html.

Golden, D.C., et al. 2001. A Simple Inorganic Process for Formation of Carbonates, Magnetite, and Sulfides in Martian Meteorite ALH84001. *American Mineralogist.* 86: 370-375.

Gregerson, J. 1999. Conquering Corrosion (in concrete). *Building Design & Construction.* 40(8): 50.

Hassan, A.M. et al. 1989. Corrosion Resistant Materials for Seawater RO Plants. *Desalination.* 74: 157-170.

Hein, J.R. et al. 2006. Methanogen c calc te, $^{13}$C-depleted b valve shells, and gas hydrate from a mud volcano offshore southern Cal forn a. *Geological Society of America.* 34(2): 109-112.

Horii, Y. et al. 2007. Novel evidence for natural formation of dioxins in ball clay. *Chemosphere.* 70: 1280-1289.

International Search Report dated Jan. 20, 2009 of PCT/US2007/010032.

International Search Report dated Dec. 14, 2010 of EP09812408.4.
International Search Report dated Jul. 29, 2010 of EP08873036.1.
International Search Report dated Jan. 4, 2011 of EP09818485.6.
International Search Report dated Sep. 13, 2010 of PCT/US10/035041.

Jensen, P. et al. 1992. 'Bubbling reefs' in the Kattegat: submarine landscapes of carbonate-cemented rocks support a diverse ecosystem at methane seeps. *Marine Ecology Progress Series.* 83: 103-112.

Li, et al., "Using Electrolytic Method to Promote CO2 Sequestration in Serpentine by Mineral Carbonation," Journal of China University of Mining and Technology, 36(6), pp. 817-821 (2007) (in Chinese, with English translation).

Lopez-Capel, E. et al. 2005. Application of simultaneous thermal analysis mass spectrometry and stable carbon isotope analysis in a carbon sequestration study. *Rapid Communications in Mass Spectrometry.* 19: 3192-3198.

Perkins, S. 2004. Sea Change: Carbon Dioxide Imperils Marine Ecosystems. *Science News.* 166(3): 35.

Sample, J.C. et al. 1995. Isotope Geochemistry of Syntectonic Carbonate Cements and Veins from the Oregon Margin: Implications for the Hydrogelogic Evolution of the Accretionary Wedge. *Proceedings of the Ocean Drilling Program, Scientific Results.* 146: 137-148.

Sakata, M. 1987. Movement and Neutralization of Alkaline Leachate at Coal Ash Disposal Sites. *Environ. Sci. Technol.* 21(8): 771-777.

Shaffer, R. 2008. A Devlish Green Angel. *Fast Company.* N127: 92-97.

Skrzypek, G. et al. 2006. $\delta^{13}C$ analyses of calcium carbonate: comparison between the GasBench and elemental analyzer techniques. *Rapid Communications in Mass Spectrometry.* 20: 2915-2920.

Socolow, R. 1997. Fuels Decarbonization and Carbon Sequestration: Report of a Workshop. Center for Energy and Environmental Studies School of Engineering and Applied Science. Princeton University, Princeton, NJ.

Soong, Y. et al. 2004. Experimental and simulation studies on mineral trapping of CO2 with brine. *Energy Conversion and Management.* 45: 1845-1859.

Technology for Commercialization of Slag. 1995. *New Technology Japan.* ISSN: 0385-6542. p35.

Zhang, C.L. et al. 2001. Temperature-dependent oxygen and carbon isotope fractionations of biogenic siderite. *Geochimica et Cosmochimica Acta.* 65(14): 2257-2271.

Constantz, B. 2009. The Risk of Implementing New Regulations on Game-Changing Technology: Sequestering CO2 in the Built Environment. AGU, 90(22), Jt. Assem, Suppl., Abstract.

Bagotsky, V.S. 2006. Conductive Polymers: Polymers with Ionic Functions. *Fundamentals of Electrochemistry.* Second Edition. New Jersey: John Wiley & Sons. pp. 454-455.

Bradfield, D.L. 1984. Conventional Uranium Processing: The Yeelirrie Uranium Project. *Practical Hydromet '83—7th Annual Symposium on Uranium and Precious Metals.* pp. 39-47. Lakewood, CO.

Eldorado Beaverlodge Operation. 1960. *Canadian Mining Journal.* 81(6): 111-138.

International Search Report dated Apr. 13, 2011 of PCT/US10/57821.

International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated Apr. 6, 2011 of EP10192919.8.
International Search Report dated May 18, 2011 of EP09812407.6.
International Search Report dated Apr. 19, 2011 of PCT/US2010/059835.

Merritt, R.C. 1971. Carbonate Leaching. The Extractive Metallurgy of Uranium: pp. 82-97. Colorado School of Mines Research Institute. Prepared Under Contract with the United States Atomic Energy Commission.

Metz. 2005. IPCC Special Report on Carbon Dioxide Capture and Storage. Cambridge University. P. 324.

Various authors. 2001. "Calcium Carbonate: From the Cretaceous Period Into the 21st Century." Birkhauser Verlag, pp. 1-54.

* cited by examiner

CO₂ UTILIZATION IN ELECTROCHEMICAL SYSTEMS

CROSS-REFERENCE

This application claims priority to commonly assigned and co-pending U.S. Provisional Patent Application No. 61/081,299 filed Jul. 16, 2008, titled: "Low Energy pH Modulation for Carbon Sequestration Using Hydrogen Absorptive Metal Catalysts", herein incorporated by reference in its entirety.

This application claims priority to commonly assigned and co-pending U.S. Provisional Patent Application No. 61/091,729 filed Aug. 25, 2008, titled: "Low Energy Absorption of Hydrogen Ion from an Electrolyte Solution into a Solid Material", herein incorporated by reference in its entirety.

This application claims priority to commonly assigned and co-pending U.S. Provisional Patent Application No. 61/222,456 filed Jul. 1, 2009, titled: "$CO_2$ Utilization In Electrochemical Systems", herein incorporated by reference in its entirety.

This application is a continuation-in-part of commonly assigned PCT Patent Application no. PCT/US09/48511 filed on Jun. 24, 2009, titled: "Low Energy 4-Cell Electrochemical System with Carbon Dioxide Gas," which is a continuation-in-part of PCT Patent Application no. PCT/US09/032301, filed Jan. 28, 2009, titled: "Low-Energy Electrochemical Bicarbonate Ion Solution," and a continuation-in-part of PCT Patent Application no. PCT/US08/088242, filed Dec. 23, 2008, titled "Low Energy Electrochemical Hydroxide System and Method," each of which is incorporated herein by reference in its entirety, and to each of which we claim priority."

BACKGROUND OF THE INVENTION

In many industrial processes a large amount of hydroxide ions in a base solution is utilized to achieve a desired reaction, e.g., to neutralize an acid, or buffer the pH of a solution, or precipitate an insoluble hydroxide and/or carbonate and/or bicarbonate from a solution. One method by which the hydroxide ions are produced is by an electrochemical system as disclosed in the above-referenced patent applications, herein incorporated by reference in their entirety. In producing the hydroxide ions electrochemically, a large amount of electrical energy is used; consequently, minimizing the electrical energy used is highly desired.

SUMMARY OF THE INVENTION

This invention pertains to a low-voltage, low-energy electrochemical system and method of removing protons, or producing hydroxide ions or both in a cathode electrolyte while dissolving carbon dioxide gas in the cathode electrolyte. In the system, in various embodiments, the cathode electrolyte is partitioned into a first cathode electrolyte compartment and a second cathode electrolyte compartment such that the cathode electrolytes in the two cathode electrolyte compartments are in contact with each other. However, since gas flow between the two cathode electrolyte compartments is restricted, carbon dioxide gas provided to the first cathode electrolyte compartment is prevented from contacting cathode electrolyte in the second cathode electrolyte compartment.

In the system, the cathode is in contact with the cathode electrolyte in the second cathode electrolyte compartment and both the cathode electrolyte and the anode electrolyte are composed of an aqueous solution. In the system, by absorbing carbon dioxide in the cathode electrolyte to form carbonate and bicarbonate ions and also to affect the pH of the cathode electrolyte, the hydroxide ions are produced in the cathode electrolyte with a relatively low voltage across the anode and cathode e.g., a voltage of 3V or less, such as 2V or less, or 1V or less.

In the system, water in the cathode electrolyte is reduced to hydrogen gas and hydroxide ions at the cathode. At the anode, hydrogen gas, provided to the anode from an external source, is oxidized to hydrogen ions. In some embodiments, the hydrogen gas produced at the cathode is directed to the anode for oxidation to hydrogen ions. In the system, a gas, e.g., oxygen or chlorine is not produced at the anode when the low voltage is applied across the anode and cathode. In the system, hydrogen ions produced at the anode migrate into the anode electrolyte to form an acid solution in the anode electrolyte; and, in the system, hydroxide ions produced at the cathode migrate into the cathode electrolyte to produce the base solution in the cathode electrolyte.

In the system, the carbon dioxide gas provided to the cathode electrolyte in the first cathode electrolyte compartment dissolves to produce carbonic acid. Depending on the pH of the cathode electrolyte, the carbonic acid in the cathode electrolyte dissociate into carbonate ions and bicarbonate ions. Thus, in the system, since the cathode electrolyte in the first compartment can mix with the cathode electrolyte in the second cathode electrolyte compartment, mixing of the cathode electrolytes in the two cathode electrolyte compartments will result in the cathode electrolyte comprising carbonic acid, hydroxide ions and/or carbonate ions and/or bicarbonate ions.

In the system, the voltage across the cathode and anode is dependent on several factors including the difference in the pH value of the anode electrolyte and the cathode electrolyte, as well as the ohmic resistances between the cathode and anode. Thus, in various embodiments, by controlling the difference in pH between the cathode electrolyte and the anode electrolyte, e.g., by dissolving more or less carbon dioxide in the cathode electrolyte, the system will produce hydroxide ions and/or carbonate ions and/or bicarbonate ions in the cathode electrolyte while minimizing the voltage across the anode and cathode, thus minimizing the use of electrical energy.

In one embodiment, the invention provides a system comprising a cathode compartment partitioned into a first cathode electrolyte compartment and a second cathode electrolyte compartment by a partition wherein, cathode electrolyte in the second cathode electrolyte compartment is in contact with a cathode, and anode electrolyte in an anode compartment is in contact with an anode.

In another embodiment, the invention provides a method comprising directing a gas into a cathode electrolyte in a first cathode electrolyte compartment; and applying a voltage across a cathode in contact with cathode electrolyte in a second cathode electrolyte compartment that is partitioned from the first cathode electrolyte compartment, and an anode that is in contact with an anode electrolyte.

In various embodiments, by partitioning the cathode electrolyte into the first and second cathode electrolytes compartments, and by restricting carbon dioxide gas to the first cathode electrolyte compartment, contact between the carbon dioxide gas and the cathode and/or with the anode and/or with other electrolytes in the system is restricted. Thus, advantageously, in the system, carbon dioxide gas from a variety of sources, including carbon dioxide from industrial waste gases, e.g., from burning fossil fuels in electrical generating plants and from cement plants, can be utilized. Also, by restricting carbon dioxide gas to the first cathode electrolyte compartment, mixing of carbon dioxide gas with other gases in the system, e.g., mixing of the carbon dioxide with hydrogen gas generated at the cathode, or mixing of carbon dioxide with hydrogen gas supplied to the anode, is avoided.

BRIEF DESCRIPTION OF THE DRAWINGS

The following drawings illustrate by way of examples and not by limitation embodiments of the present system and method.

DETAILED DESCRIPTION OF THE INVENTION

Figure 1:
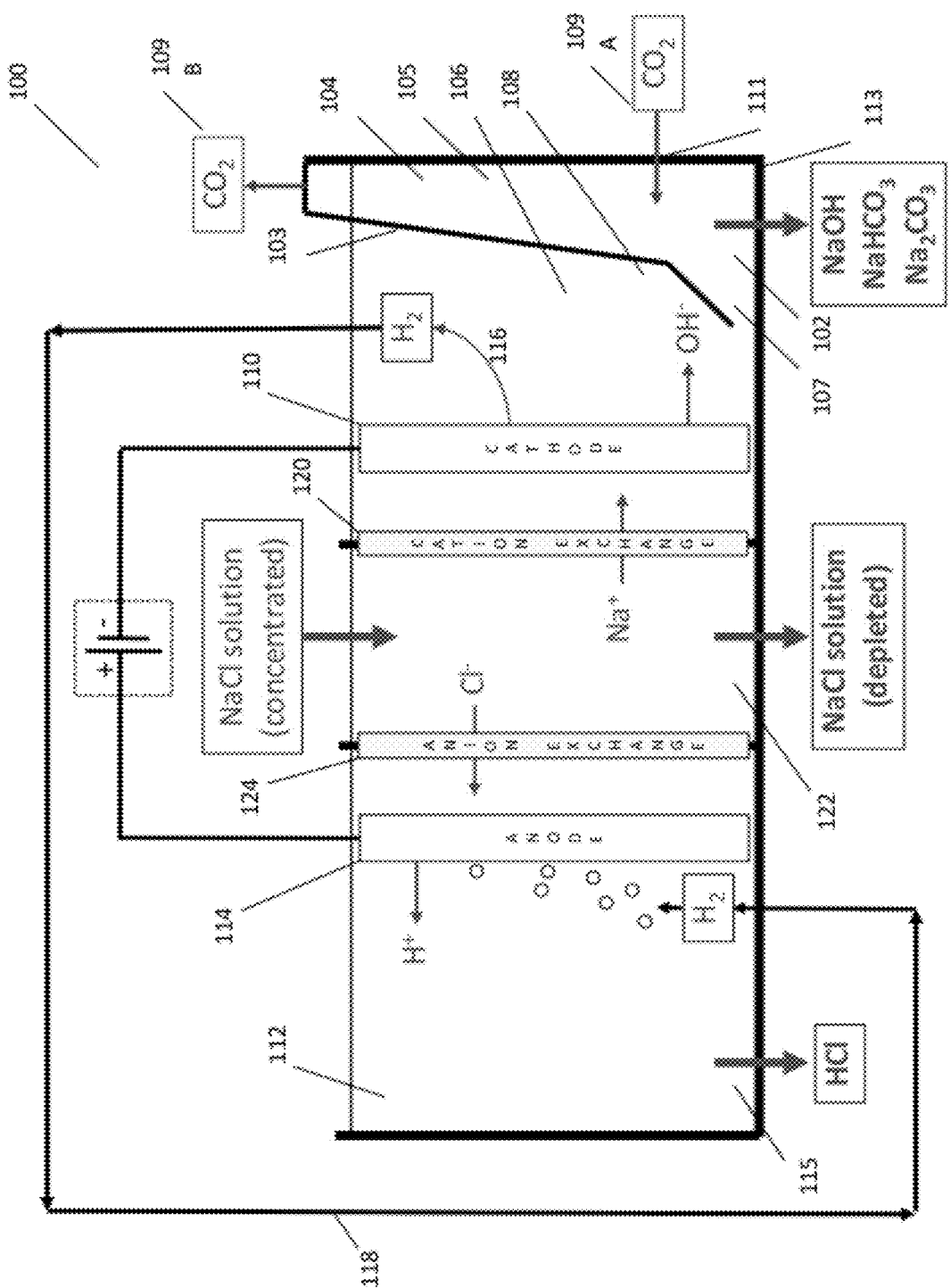
FIG. 1 is an illustration of an embodiment of the present system.

In the following detailed description, unless defined otherwise, all technical and scientific terms have the same meaning as commonly understood by one of ordinary skill in the art to which this invention pertains. Herein, all cited publications and patents are incorporated by reference herein in their entirety. Herein, the date cited for publication may differ from the actual publication dates; thus, an actual publication should be independently confirmed. Herein, the singular "a," "an," and "the" include plural references unless the context clearly dictates otherwise.

Herein, exemplary systems and methods are disclosed wherein sodium chloride solution is used in one compartment between the anode electrolyte and cathode electrolyte to produce sodium hydroxide and/or sodium carbonate ions and/or sodium bicarbonate in the cathode electrolyte, and hydrochloric acid in the anode electrolyte. However, as will be appreciated by one ordinarily skilled in the art, the system and method are not limited to the use of sodium chloride solution as disclosed in these exemplary embodiments since the system and method are capable of using an equivalent salt solution, e.g., an aqueous solution of potassium sulfate and the like to produce an equivalent result. Similarly, in preparing the electrolytes for the system, it will be appreciated that water from various sources can be used including seawater, brackish water, brines or naturally occurring fresh water, provided that the water is purified to an acceptable level for use in the system. Therefore, to the extent that such equivalents embody the present system and method, these equivalents are within the scope of the appended claims.

As disclosed in U.S. Provisional Patent Application No. 61/081,299 filed Jul. 16, 2008, titled: "Low Energy pH Modulation for Carbon Sequestration Using Hydrogen Absorptive Metal Catalysts", herein incorporated by reference in its entirety, in various embodiments, the anode and the cathode of the present system may comprise a noble metal, a transition metal, a platinum group metal, a metal of Groups IVB, VB, VIB, or VIII of the periodic table of elements, alloys of these metals, or oxides of these metals. Exemplary materials include palladium, platinum, iridium, rhodium, ruthenium, titanium, zirconium, chromium, iron, cobalt, nickel, palladium-silver alloys, and palladium-copper alloys. In various embodiments, the cathode and/or the anode may be coated with a reactive coating comprising a metal, a metal alloy, or an oxide, formed by sputtering, electroplating, vapor deposition, or any convenient method of producing a layer of reactive coating on the surface of the cathode and/or anode. In other embodiments, the cathode and/or the anode may comprise a coating designed to provide selective penetration and/or release of certain chemicals or hydroxide ions and/or antifouling protection. Exemplary coatings include non-metallic polymers; in specific embodiments herein, an anode fabricated from a 20-mesh Ni gauze material, and a cathode fabricated from a 100-mesh Pt gauze material was used.

In various embodiments, the electrolyte in the cathode compartment is charged with $CO_2$, e.g., by bubbling $CO_2$ into the electrolyte. The source of $CO_2$ may include $CO_2$ in waste gases of an industrial plant such as the flue gas of a fossil fuelled electrical power generating plant. In various embodiments, the system includes a gas mixer/gas absorber that enhances the absorption of $CO_2$ in the cathode electrolyte. In one embodiment, the gas mixer/gas absorber comprised a series of spray nozzles that produced a flat sheet or curtain of liquid through which the gas was directed for absorption; in another embodiment the gas mixer/gas absorber comprised spray absorber that created a mist into which the gas was directed for absorption; other commercially available gas/liquid absorber e.g., an absorber available from Neumann Systems, Colorado, USA may be used. In operation, the cathode and anode compartments are filled with electrolytes and a voltage is applied across the cathode and anode. In various embodiments, the voltage is adjusted to a level to cause production of hydrogen gas at the cathode without producing a gas, e.g., chlorine or oxygen, at the anode. In various embodiments, the system includes a cathode and an anode that facilitate reactions whereby the cathode electrolyte is enriched with hydroxide ions and the anode electrolyte is enriched with hydrogen ions.

Reduction of water at the cathode produces hydroxide ions that migrate into the cathode electrolyte. The production of hydroxide ions in the cathode electrolyte surrounding the cathode may elevate the pH of the cathode electrolyte. In various embodiments, the solution with the elevated pH is used in situ, or is drawn off and utilized in a separate reaction, e.g., to sequester $CO_2$ as described therein. Depending on the balance of the rate of hydroxide ion production versus the rate of carbon dioxide absorption in the cathode electrolyte, it is possible for the pH to remain the same or even decrease, as hydroxide ions are consumed in reaction with protons from dissociation of carbonic acid into carbonate and bicarbonate ions.

Oxidation of hydrogen gas at the anode results in production of hydrogen ions at the anode that desorb from the structure of the anode and migrate into the electrolyte surrounding the anode, resulting in a lowering of the pH of the anode electrolyte. Thus, the pH of the electrolytes in the system can be adjusted by controlling the voltage across the cathode and anode and using electrodes comprised of a material capable of absorbing or desorbing hydrogen ions. In various embodiments, the process generates hydroxide ions in solution with less than a 1:1 ratio of $CO_2$ molecules released into the environment per hydroxide ion generated.

In various embodiments, the system includes an inlet system configured to deliver carbon dioxide gas into the first cathode electrolyte compartment; the carbon dioxide includes carbon dioxide from waste gases of fossil fuelled electrical power generating plants, cement plants and the like. In various embodiments, the carbon dioxide gas delivered to the inlet system may comprise other gases, e.g., oxides of nitrogen (nitrous oxide, nitric oxide) and sulfur gases (sulfur dioxide, hydrogen sulfide); in various embodiments, the system includes a gas treatment system that is capable of removing constituents in the carbon dioxide gas before the gas is utilized in the cathode compartment.

As disclosed in U.S. Provisional Patent Application No. 61/091,729 filed Aug. 25, 2008, titled: "Low Energy Absorption of Hydrogen Ion from an Electrolyte Solution into a Solid Material", herein incorporated by reference in its entirety, the present method in one embodiment pertains to a low-energy absorption of hydrogen ions from an electrolytic fluid into a solid material. In some embodiments, a hydrogen ion transfer element is configured to transfer hydrogen ions between the cathode electrolyte and anode electrolytes in the system. In various embodiments, the process pertains to removal of protons from bicarbonate ions or carbonic acid in the cathode electrolyte. In various embodiments, hydrogen ions are transferred from one electrolyte solution to another using a hydrogen transfer element that includes a hydrogen storage material such as a palladium membrane, foil, or film. In various embodiments, hydrogen ions are obtained from a proton donor, e.g., carbonic acid, bicarbonate ion, water, and the like and are transferred to a second electrolyte solution. In various embodiments, hydrogen ions and/or carbonate ions are produced by contacting an electrolyte solution with $CO_2$, to remove protons from bicarbonate ions present in the solution. In various embodiments, transferring the hydrogen ions to a second electrolyte solution while contacting a first electrolyte solution with $CO_2$ allows for a greater concentration of bicarbonate ions in the first electrolyte solution.

In various embodiments, the anode electrolyte, enriched with hydrogen ions, can be utilized for a variety of applications including dissolving minerals to produce a solution of divalent cations for use in sequestering carbon dioxide. In various embodiments, the electrolytic cell includes a cathode and/or an anode capable of facilitating reactions to remove hydrogen ions from an electrolytic fluid from a donor molecule in an electrolytic fluid, e.g., to enrich a solution with hydroxide ions or hydrogen ions, where donor molecules of interest include carbonic acid, bicarbonate ions, water, and the like.

The absorption of hydrogen ions from a solution into the structure of a cathode produces an excess of hydroxide ions in the solution surrounding the cathode. In various embodiments, the cathode electrolyte can be used in situ, or drawn off and to utilized in a separate reaction, for a variety of purposes, including the sequestration of $CO_2$ as described therein. In various embodiments, the hydrogen ions can be desorbed from the structure when arranged as an anode to produce excess hydrogen ions in a solution in contact with the anode to lower the pH of the solution.

In some embodiments, the electrolyte solution in a half-cell is charged with ionized forms of $CO_2$ for example, by bubbling $CO_2$ from a source into the electrolyte solution. Ionized forms of $CO_2$ include bicarbonate ions ($HCO_3^-$) and carbonate ions ($CO_3^{-2}$). The source of carbon dioxide can be, for instance, a waste feed from an industrial plant such as flue gas from a fossil fuelled electrical power generating plant or a cement plant. The $CO_2$ can be introduced into the electrolyte solution with a sparger, in some embodiments, or by contact with an aqueous liquid spray. In some systems, the reservoir can be enriched with bicarbonate and/or carbonate ions by introducing $CO_2$ gas into the reservoir as hydrogen is removed. In some systems, an electrolyte solution within a reservoir can be flushed to prevent a build-up of hydrogen ions within the reservoir that would oppose the continued transfer of hydrogen ions between the two reservoirs. In some embodiments, the voltage applied across the anode and the cathode is less than 1.24 volts or less than 1.0 volt. The half-cell can include a mixer to help the $CO_2$ absorb and dissolve into the electrolyte solution. In various embodiments, a conductive electrolyte solution can be employed as the electrolyte solution within the reservoir and in some embodiments the electrolyte solution comprises seawater, brine, or brackish water.

As disclosed herein, in various embodiments, hydroxide ions are produced in the cathode electrolyte in a first cathode electrolyte compartment by applying a relatively low voltage, e.g., less than 3V, such as less than 2V, or less than 1V or less than 0.8V or less than 0.6V or less than 0.4V across the cathode and anode while dissolving carbon dioxide in the cathode electrolyte in a second cathode electrolyte compartment. In various embodiments, hydroxide ions are produced from water in the cathode electrolyte in contact with the cathode, and bicarbonate ions and/or carbonate ions are produced in the cathode electrolyte in the first cathode electrolyte compartment by dissolving carbon dioxide gas in the cathode electrolyte in the first cathode electrolyte compartment.

In various embodiments, cathode electrolyte in the first cathode electrolyte compartment is in contact with the cathode electrolyte in the second cathode electrolyte compartment. The cathode electrolyte in the first cathode electrolyte compartment may comprises a gas or a gas dissolved in the cathode electrolyte. For example, the carbon dioxide is present as carbon dioxide gas and/or as dissolved carbon dioxide in the cathode electrolyte. In various embodiments, the carbon dioxide gas is isolated from cathode electrolyte in the second cathode electrolyte compartment.

In various embodiments, the cathode electrolyte in the first cathode electrolyte compartment comprises hydroxide ions, carbonic acid, carbonate ions and/or bicarbonate ions. Similarly, the cathode electrolyte in the second cathode electrolyte compartment comprises dissolved carbon dioxide. In other embodiments, the cathode electrolyte in the second cathode electrolyte compartment comprises hydroxide ions, carbonic acid, carbonate ions and/or bicarbonate ions.

In various embodiments, the system is configured to produce hydroxide ions in the second cathode electrolyte compartment with less than 2V applied across the anode and cathode. The system is also configured to produce hydrogen gas at the cathode. In various embodiments, the system does not produce a gas at the anode; the system, however, is configured to migrate hydroxide ions from the second cathode electrolyte compartment to the first cathode electrolyte compartment. In other embodiments, the system comprises a hydrogen gas delivery system configured to direct hydrogen gas produced at the cathode to the anode. In one embodiment, the first cathode electrolyte compartment is operatively connected to an industrial waste gas system that comprises carbon dioxide. In various embodiments, the carbon dioxide is derived from combusting fossil fuels.

In other embodiments, the cathode compartment is operatively connected to a waste gas treatment system, wherein the waste gas system comprises carbon dioxide. In other embodiments, the cathode compartment is operatively connected to a hydroxide, carbonate and/or bicarbonate precipitation system. In various embodiments, the precipitation system is configured to utilize the cathode electrolyte to produce hydroxide, carbonates and/or divalent cation bicarbonates. In various embodiments, the anode and cathode are operatively connected to an off-peak electrical power-supply system.

In various embodiments, the system comprises an ion exchange membrane located between the anode compartment and the cathode compartment. In various embodiments, the ion exchange membranes comprise a cation exchange membrane separating the cathode electrolyte in the second cathode electrolyte compartment from a third electrolyte. In various embodiments, the ion exchange membrane comprises an anion exchange membrane separating the anode electrolyte from the third electrolyte.

In various embodiments, the third electrolyte comprises sodium ions and chloride ions; the system is configured to migrate sodium ions from the third electrolyte to cathode electrolyte through the cation exchange membrane, and migrate chloride ions from the third electrolyte to the anode electrolyte through the anion exchange membrane.

In various embodiments, the system is configured to produce sodium hydroxide in the cathode electrolyte; and the system is also configured to produce sodium hydroxide, sodium carbonate and/or sodium bicarbonate in the cathode electrolyte. In various embodiments, the system is configured to produce partially desalinated water in the third electrolyte; and the partially desalinated water is operatively connected to a water treatment system. In other embodiments, the cathode electrolyte is operatively connected to a first carbon dioxide gas/liquid contactor configured to dissolve carbon dioxide in the cathode electrolyte; the system is configured to produce a pH differential of between 0 and 14 or greater pH units between the anode and cathode electrolytes.

In various embodiments, by the method, hydroxide ions, carbonic acid, carbonates ions and/or bicarbonate ions are produced in the first cathode electrolyte compartment; and carbonate ions and/or bicarbonate ions are produced in the second cathode electrolyte compartment. In various embodiments, hydrogen gas is produced at the cathode and hydrogen ions are produced at the anode.

In various embodiments, by the method, a gas is not produced at the anode; however, hydrogen gas is produced at the cathode and in some embodiments is directed to the anode. In various embodiments, the voltage across the anode and cathode is less than 2V. By the method, sodium ions are migrated from the third electrolyte to the cathode electrolyte across the cation exchange membrane, and chloride ions are migrated from the third electrolyte to the anode electrolyte across the anion exchange membrane. By the method, sodium carbonate, sodium bicarbonate or sodium hydroxides are produced in the cathode electrolyte, and hydrochloric acid is produced in the anode electrolyte. By the method, acid produced in the anode electrolyte is utilized to dissolve a mafic mineral and/or a cellulose material.

By the method, partially desalinated water is produced in the third electrolyte. In one embodiment, divalent cation hydroxide, carbonate and/or bicarbonate compounds are produced by contacting the cathode electrolyte with a solution comprising divalent cations, e.g., calcium and magnesium ions. In one embodiment, the method includes a step of withdrawing a first portion of the cathode electrolyte; dissolving carbon dioxide in the first portion of cathode electrolyte to produce a first enriched carbonated cathode electrolyte; and replenishing cathode electrolyte with the first enriched carbonated cathode electrolyte. In other embodiments, the method comprises the steps of withdrawing a second portion of the cathode electrolyte; dissolving carbon dioxide in the second portion of cathode electrolyte to produce a second enriched carbonated cathode electrolyte; and contacting the second enriched carbonated cathode electrolyte with a divalent cation solution to produce divalent cation carbonates. In various embodiments, the method includes applying an off-peak electrical power-supply across the cathode and anode to provide the voltage across the anode and cathode.

By the system and method, hydrogen gas is produced at the cathode from water in the cathode electrolyte. In various embodiments, a gas, e.g., oxygen or chlorine is not produced at the anode; in various embodiments, hydrogen gas from an external source is provided to the anode where it is oxidized to hydrogen ions that migrate into the anode electrolyte to produce an acid in the anode electrolyte.

In various embodiments, hydroxide ions produced at the cathode in the second cathode electrolyte compartment migrate into the cathode electrolyte and may cause the pH of the cathode electrolyte to adjust, e.g., the pH of the cathode electrolyte may increase, decrease or remain the same, depending on the rate of removal of cathode electrolyte from the system. In various embodiments, depending on the pH of the cathode electrolyte and the rate of dissolution of carbon dioxide in the first cathode electrolyte compartment, carbon dioxide gas in contact with cathode electrolyte in the first cathode compartment will dissolve in the cathode electrolyte to produce carbonic acid which may dissociate to bicarbonate and/or carbonate ions in the cathode electrolyte, depending on the pH of the cathode electrolyte. Thus, in various embodiments, since the cathode electrolyte in the first and second cathode electrolyte compartment can intermix, the cathode electrolyte may contain carbonic acid, hydroxide ions and/or carbonate ions and/or bicarbonate ions.

In various embodiments, the system includes a hydrogen gas transfer system configured to direct hydrogen gas to the anode where the hydrogen gas is oxidized, without intermixing the hydrogen gas with carbon dioxide present in the cathode electrolyte compartment. In various embodiments, the hydrogen gas produced at the cathode is directed to the anode for oxidation to hydrogen ions.

In various embodiments, a portion of or the entire amount of cathode electrolyte comprising bicarbonate ions and/or carbonate ions/and or hydroxide ions is withdrawn from the system via an outflow stream. In some embodiments, a portion of the withdrawn cathode electrolyte is contacted with carbon dioxide gas in an exogenous carbon dioxide gas/liquid contactor to increase the absorbed carbon dioxide content in the electrolyte solution. In some embodiments, the solution with the absorbed carbon dioxide is returned to the cathode compartment; in other embodiments, the solution with the absorbed carbon dioxide is reacted with a solution comprising divalent cations to produce divalent cation hydroxides, carbonates and/or bicarbonates. In various embodiments, the system and method are configurable for batch, semi-batch or continuous flow operation.

In various embodiments, industrial waste gas containing carbon dioxide is utilized to produce carbonate and bicarbonate ions in the cathode electrolyte. In some embodiments, carbon dioxide is prevented from mixing with other gases in the system, e.g., with hydrogen gas generated at the cathode or with hydrogen gas oxidized at the anode. In other embodiments, carbon dioxide gas is prevented from contacting the cathode and/or anode.

In various embodiments, the pH of the cathode electrolyte is adjusted by producing hydroxide ions from water at the cathode, and allowing the hydroxide ions to migrate into the cathode electrolyte. The pH is also adjusted by dissolving carbon dioxide gas in the cathode electrolyte to produce carbonic acid and carbonic ion species in the electrolyte that react with the hydroxide ions to produce carbonate ions, or bicarbonate ions, or only carbonate ions, or only bicarbonate ions, or mixtures thereof.

Figure 2:
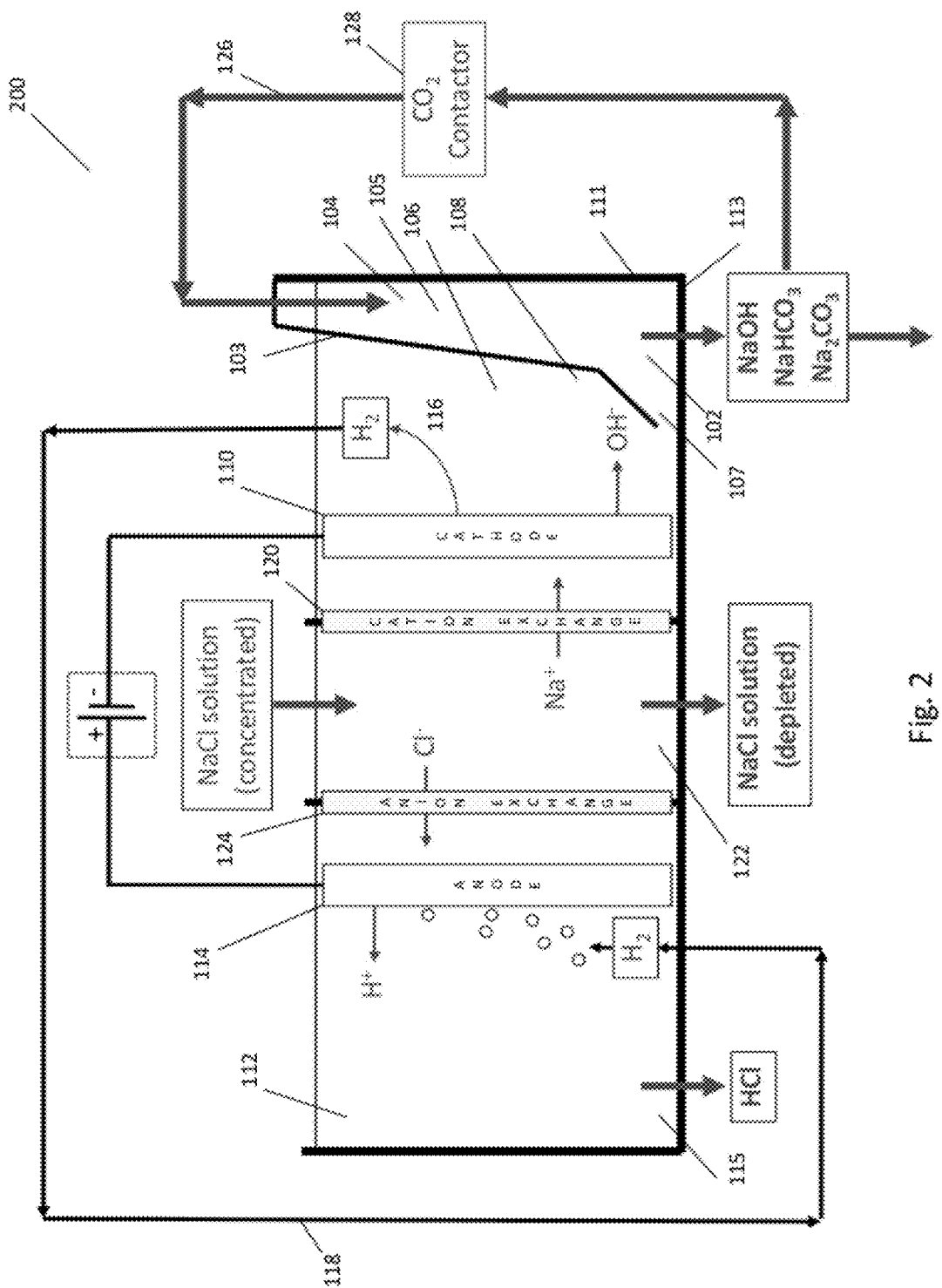
FIG. 2 is an illustration of an embodiment of the present system.
Figure 3:
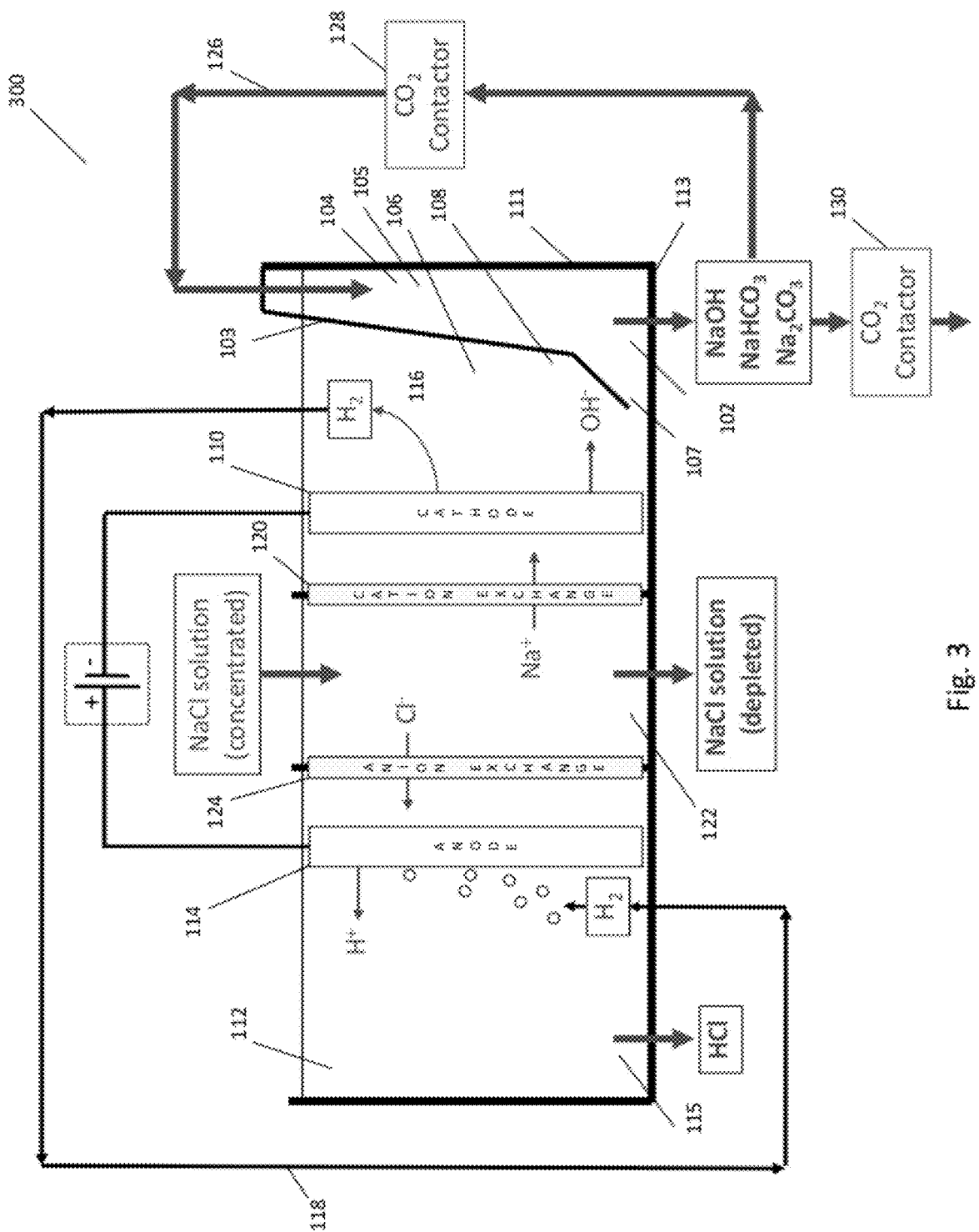
FIG. 3 is an illustration of an embodiment of the present system.

With reference to FIGS. 1-3, the system 100, 200, 300 in various embodiments comprises a cathode compartment 102 partitioned into a first cathode electrolyte compartment 104 and a second cathode electrolyte compartment 106 wherein, cathode electrolyte 108 in the second cathode electrolyte compartment is in contact with a cathode 110; and wherein anode electrolyte 115 in an anode compartment 112 is in contact with an anode 114. As is illustrated in FIGS. 1-3, the system includes partition 103 that partitions the cathode compartment 102 into the first cathode electrolyte compartment 104 and the second cathode electrolyte compartment 106 such that on placing electrolyte in the cathode compartment, liquid flow between the cathode electrolyte in the first cathode electrolyte compartment 104 and cathode electrolyte in the second cathode electrolyte compartments 106 is possible. In various embodiments, initially the cathode electrolytes comprise an aqueous salt solution e.g., sodium hydroxide, prepared by dissolving the salt in a water-based solvent, e.g., an acceptably clean fresh water, salt water, brackish water, seawater, man-made saltwater and the like.

As is illustrated in a cross-section view in FIGS. 1-3, a partition 103 is configured in an approximate J-shape structure and is positioned in the first cathode electrolyte compartment 104 to define an upward-tapering channel 105 in the first cathode compartment between the partition 103 and a sidewall 111 of the cathode electrolyte compartment. Partition 103 also defines a downward-tapering channel 107 in the first cathode electrolyte compartment between the partitioning member and a bottom wall 113 of the cathode electrolyte compartment.

In positioning partition 103 in the cathode compartment 102, cathode electrolyte in the cathode compartment is partitioned into the first cathode electrolyte compartment 104 and the second cathode electrolyte compartment 106. In various embodiments, partition 103 is configured such that cathode electrolyte in cathode compartment 102 can flow between the first and second electrolyte compartments; however, partition 103 is also configured such that a gas in the first electrolyte compartment 104 is prevented from mixing with other fluids in the system when cathode electrolyte is present in the cathode compartment 102, at least at a depth that the liquid seals the passageway between the downward-tapering channel 107 in the first cathode electrolyte compartment 104 and the second cathode electrolyte compartment 106.

With reference to FIG. 1, on introducing carbon dioxide gas 109A, in a lower portion of the first cathode electrolyte compartment 104 with cathode electrolyte present, a portion of the gas may dissolve in the cathode electrolyte while un-dissolved gas being less dense than the electrolyte will bubble upward in upward-tapering channel 105 in the first cathode electrolyte compartment from where it may be vented as vent gas 109B. In some embodiments not shown, the vent gas 109B is recovered and reused as input carbon dioxide gas 109A.

With reference to FIGS. 1-3, depending on the pH of the cathode electrolyte, carbon dioxide gas 109A introduced into the first cathode electrolyte compartment 104 will dissolve in the cathode electrolyte in the first cathode electrolyte compartment 104 and reversibly dissociate and equilibrate to produce carbonic acid, protons, carbonate and/or bicarbonate ions in the first cathode electrolyte compartment as follows:

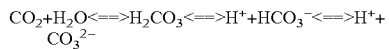

As cathode electrolyte in the first cathode electrolyte compartment 104 may mix with cathode electrolyte in the second cathode electrolyte compartment 106 and vice versa, carbonic acid, bicarbonate and carbonate ions formed in the first cathode electrolyte compartment 104 by absorption of carbon dioxide in the cathode electrolyte may migrate and equilibrate with cathode electrolyte in the second cathode electrolyte compartment 106. Thus, in various embodiments, cathode electrolyte in the first cathode electrolyte compartment may comprise dissolved and un-dissolved carbon dioxide gas, and/or carbonic acid, and/or bicarbonate ions and/or carbonate ions; while cathode electrolyte in the second cathode electrolyte compartment may comprise dissolved carbon dioxide, and/or carbonic acid, and/or bicarbonate ions and/or carbonate ions.

Also with reference to FIGS. 1-3, on applying a voltage across the anode 114 and cathode 110, the system 100, 200, 300 in the cathode compartment 102 will produce hydroxide ions in the cathode electrolyte in the second cathode electrolyte compartment 106 and hydrogen gas at the cathode 110 from reduction of water, as follows:

$2H_2O+2e^-=H_2+2OH^-$ (water is electrolyzed at the cathode).

As cathode electrolyte in the first cathode electrolyte compartment can intermix with cathode electrolyte in the second cathode electrolyte compartment, hydroxide ions formed in the second cathode electrolyte compartment may migrate and equilibrate with carbonate and bicarbonate ions in the second cathode electrolyte compartment 106. Thus, in various embodiments, the cathode electrolyte in the first cathode electrolyte compartment may comprise hydroxide ions as well as dissolved and un-dissolved carbon dioxide gas, and/or carbonic acid, and/or bicarbonate ions and/or carbonate ions; while cathode electrolyte in the second cathode electrolyte compartment may comprise hydroxide ions as well as dissolved carbon dioxide, and/or carbonic acid, and/or bicarbonate ions and/or carbonate ions.

In the cathode electrolyte, carbon dioxide gas may dissolve to form carbonic acid, protons, bicarbonate ions, and carbonate ions, depending on the pH of the electrolyte, as follows:

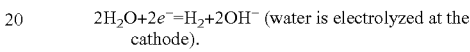

Figure 6:
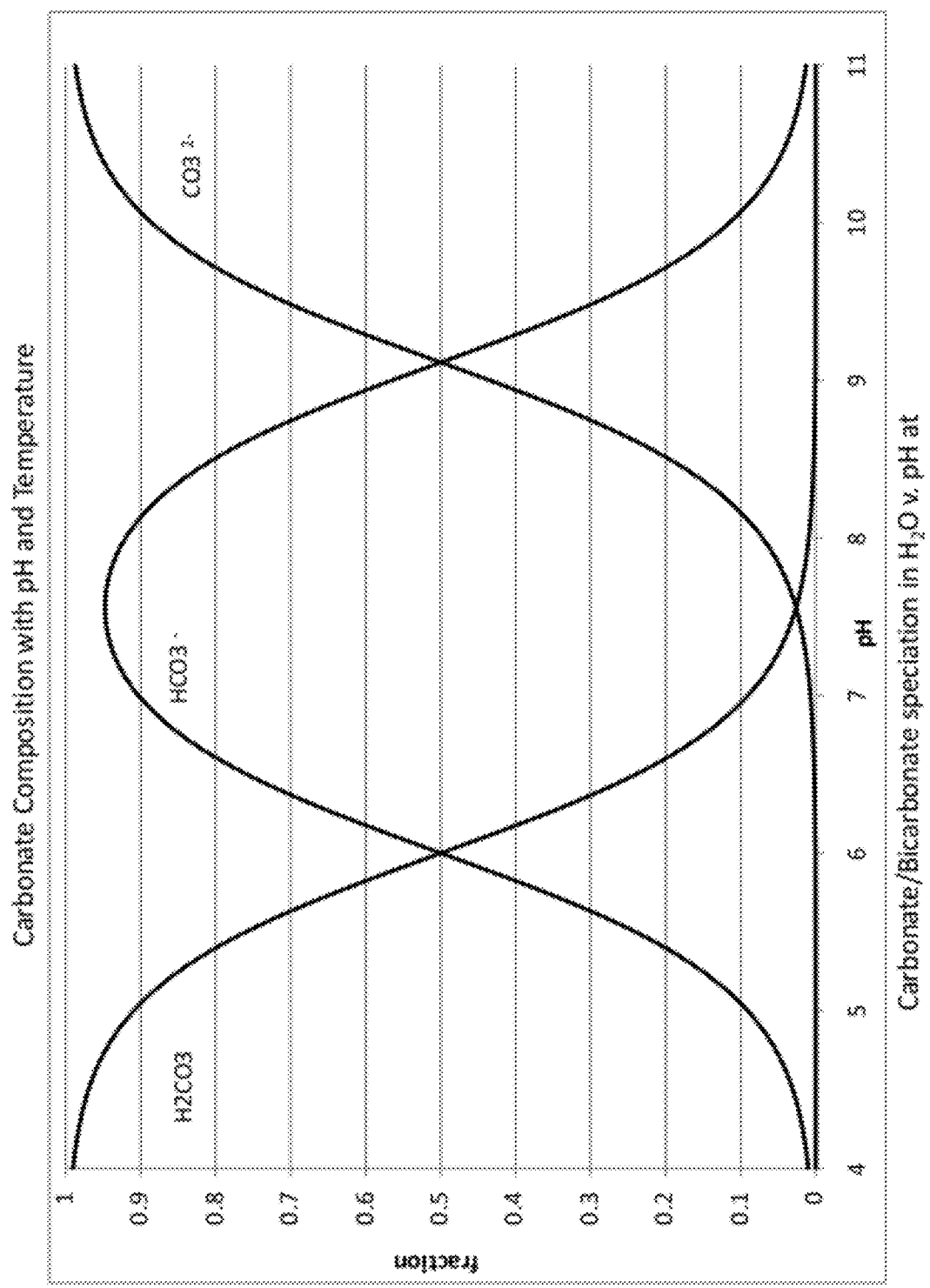
FIG. 6 is an illustration of the carbonate/bicarbonate speciation in $H_2O$ v. pH at 25 C.

As the solubility of carbon dioxide and the concentration of bicarbonate and carbonate ions in the cathode electrolyte are dependent on the pH of the electrolyte, the overall reaction in the first cathode electrolyte compartment 102 (i.e., the first cathode electrolyte compartment 104 and the second cathode electrolyte compartment 106) is either:

$2H_2O+2CO_2+2e^-=H_2+2HCO_3^-$; or  Scenario 1:

$H_2O+CO_2+2e^-=H_2+CO_3^{2-}$  Scenario 2:

or a combination of both, depending on the pH of the cathode electrolyte. This is illustrated in FIG. 6.

For either scenario, the overall cell potential of the system can be determined through the Gibbs energy change of the reaction by the formula:

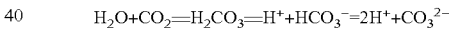

Figure 7:
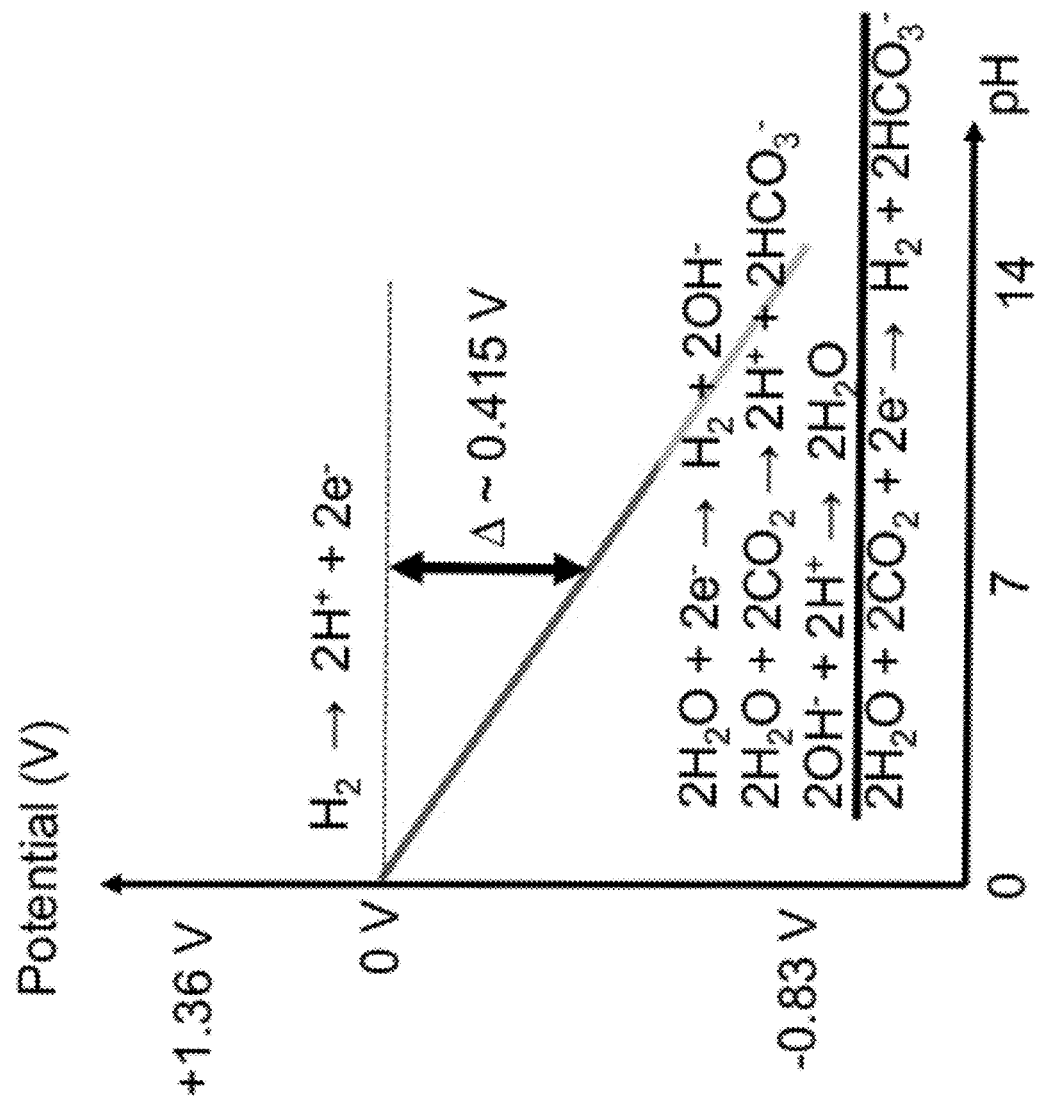
FIG. 7 is an illustration of bicarbonate ion generation in the cathode electrolyte.

Or, at standard temperature and pressure conditions:

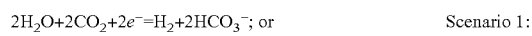

where, $E_{cell}$ is the cell voltage, $\Delta G$ is the Gibbs energy of reaction, n is the number of electrons transferred, and F is the Faraday constant (96485 J/Vmol). The $E_{cell}$ of each of these reactions is pH dependent based on the Nernst equestion as demonstrated in FIG. 7 for Scenario 1.

Also, for either scenario, the overall cell potential can be determined through the combination of Nernst equations for each half cell reaction:

$$E = E° - RT \ln(Q)/nF$$

where, E° is the standard reduction potential, R is the universal gas constant, (8.314 J/mol K) T is the absolute temperature, n is the number of electrons involved in the half cell reaction, F is Faraday's constant (96485 J/V mol), and Q is the reaction quotient such that:

$$E_{total} = E_{cathode} + E_{anode}.$$

When hydrogen is oxidized to protons at the anode as follows:

$$H_2 = 2H^+ + 2e^-,$$

E° is 0.00 V, n is 2, and Q is the square of the activity of H⁺ so that:

$$E_{anode} = +0.059 \text{ pH}_a,$$

where $pH_a$ is the pH of the anode electrolyte.
When water is reduced to hydroxide ions and hydrogen gas at the cathode as follows:

$$2H_2O + 2e^- = H_2 + 2OH^-,$$

E° is −0.83 V, n is 2, and Q is the square of the activity of OH⁻ so that:

$$E_{cathode} = -0.059 \text{ pH}_c,$$

where $pH_c$ is the pH of the cathode electrolyte.

For either Scenario, the E for the cathode and anode reactions varies with the pH of the anode and cathode electrolytes. Thus, for Scenario 1 if the anode reaction, which is occurring in an acidic environment, is at a pH of 0, then the E of the reaction is 0V for the half cell reaction. For the cathode reaction, if the generation of bicarbonate ions occur at a pH of 7, then the theoretical E is 7×(−0.059V)=−0.413V for the half cell reaction where a negative E means energy is needed to be input into the half cell or full cell for the reaction to proceed. Thus, if the anode pH is 0 and the cathode pH is 7 then the overall cell potential would be −0.413V, where:

$$E_{total} = -0.059 \text{ (pH}_a - \text{pH}_c) = -0.059 \Delta\text{pH}.$$

For Scenario 2 in which carbonate ions are produced, if the anode pH is 0 and the cathode pH is 10, this would represent an E of 0.59 V.

Thus, in various embodiments, directing $CO_2$ gas 109A into the cathode electrolyte may lower the pH of the cathode electrolyte by producing bicarbonate ions and/or carbonate ions in the cathode electrolyte, and also lower the voltage across the anode and cathode to produce hydroxide, carbonate and/or bicarbonate in the cathode electrolyte.

Thus, as can be appreciated, if the cathode electrolyte is allowed to increase to a pH of 14 or greater, the difference between the anode half-cell potential (represented as the thin dashed horizontal line, Scenario 1, above) and the cathode half cell potential (represented as the thick solid sloping line in Scenario 1, above) will increase to 0.83V. With increased duration of cell operation without $CO_2$ addition or other intervention, e.g., diluting with water, the required cell potential will continue to increase. The cell potential may also increase due to ohmic resistance loses across the membranes in the electrolyte and the cell's overvoltage potential.

Herein, overvoltage potential refers to the potential (voltage) difference between a half-reaction's thermodynamically determined reduction potential and the potential at which the redox event is experimentally observed. The term is directly related to a cell's voltage efficiency. In an electrolytic cell the overvoltage potential requires more energy than thermodynamically expected to drive a reaction. In each case, the extra or missing energy is lost as heat. Overvoltage potential is specific to each cell design and will vary between cells and operational conditions even for the same reaction. It can thus be appreciated that operation of the electrochemical cell with the cathode pH at 7 or greater provides a significant energy savings.

In various embodiments, for different pH values in the cathode electrolyte and the anode electrolyte, hydroxide ions, carbonate ions and/or bicarbonate ions are produced in the cathode electrolyte when the voltage applied across the anode and cathode was less than 3V, 2.9V, 2.8V, 2.7V, 2.6V 2.5V, 2.4V, 2.3V, 2.2V, 2.1V, 2.0V, 1.9V, 1.8V, 1.7V, 1.6V, 1.5V, 1.4V, 1.3V, 1.2V, 1.1V, 1.0V, 0.9V, 0.8V, 0.7V, 0.6V, 0.5V, 0.4V, 0.3V, 0.2V, or 0.1V. For selected voltages in the above range, the pH difference between the anode electrolyte and the cathode electrolyte was 0, 1, 2, 3, 4, 5, 6, 7, 8, 9, 10, 11, 12, 13, 14 or greater.

Also, in embodiments wherein it is desired to produce bicarbonate and/or carbonate ions in the cathode electrolyte, the system as illustrated in FIGS. 1-3, and as described above with reference to production of hydroxide ions in the cathode electrolyte, can be configured to produce bicarbonate ions and/or carbonate ions in the first cathode electrolyte by dissolving carbon dioxide in the first cathode electrolyte and applying a voltage of less than 3V, or less than 2.5 V, or less than 2V, or less than 1.5V such as less than 1.0V, or even less than 0.8 V or 0.6V across the cathode and anode.

In some embodiment as illustrated in FIGS. 1-3, the system includes a cation exchange membrane 120 that separates the cathode electrolyte in the second cathode electrolyte compartment 106 from a third electrolyte 122, and an anion exchange membrane 124 that separates anode electrolyte 115 in contact with an anode 114 from the third electrolyte 122. As can be appreciated, since a cation exchange membrane will prevent migration of anions across the cation exchange membrane, therefore hydroxide ions and/or carbonate ions and/or bicarbonate in the second cathode electrolyte compartment 106 will not migrate to the adjacent third electrolyte 122 through the first cation exchange membrane 120. Thus, in the system, the hydroxide ions and/or carbonate ions and/or bicarbonate ions will accumulate in the cathode electrolyte 108, or can be drawn off and use to sequester carbon dioxide as described in U.S. Provisional Patent Application No. 61/081,299 filed Jul. 16, 2008, supra, herein incorporated by reference in its entirety.

With reference to FIG. 1, where the third electrolyte 122 comprises a dissolved salt, e.g., sodium chloride, since a cation exchange membrane will allow migration of cations through the cation exchange membrane, therefore cations, e.g., sodium ions in the third electrolyte 122 will migrate across cation exchange membrane 120 from the third electrolyte 122 to the cathode electrolyte in the second cathode electrolyte compartment 106, on application of a voltage across the cathode 110 and anode 114. In the cathode compartment 102 sodium ions together with hydroxide ions present in the cathode electrolyte and carbonate ions from dissolved carbon dioxide will produce a sodium salt solution, e.g., sodium hydroxide, and/or sodium carbonate, and/or sodium bicarbonate solution.

Similarly with reference to FIG. 1, since an anion exchange membrane will allow migration of anions through the anion exchange membrane, therefore anions, e.g., chloride ions in the third electrolyte 122 will migrate across the anion exchange membrane 124 from the third electrolyte to the anode electrolyte 115, on application of a voltage across the cathode 110 and anode 114. In the anode electrolyte, chloride ions together with protons present in the anode electrolyte 115 will form an acid, e.g., hydrochloric acid. Consequently, as can be appreciated, since cations and anions migrate out of the third cathode electrolyte 122, the system will produce partially desalinated water from the third electrolyte 122.

In various embodiments, hydroxide ions, carbonate ions and/or bicarbonate ions produced in the cathode electrolyte, and hydrochloric acid produced in the anode electrolyzed are removed from the system, while sodium chloride in the third electrolyte is replenished to maintain continuous operation of the system.

As can be appreciated by one skilled in the art, in various embodiments, the system can be configured to operate in various production modes including batch mode, semi-batch mode, continuous flow mode, with or without the option to withdraw portions of the sodium hydroxide produced in the cathode electrolyte, or withdraw all or a portions of the acid produced in the anode electrolyte, or direct the hydrogen gas produced at the cathode to the anode where it may be oxidized.

In various embodiments, hydroxide ions, bicarbonate ions and/or carbonate ion solutions are produced in the cathode electrolyte when the voltage applied across the anode and cathode is less than 3V, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V, or less 1.5V or less, 1.4V or less, 1.3V or less, 1.2V or less, 1.1V or less, 1.0V or less, 0.9V or less or less, 0.8V or less, 0.7V or less, 0.6V or less, 0.5V or less, 0.4V or less, 0.3V or less, 0.2V or less, or 0.1 V or less.

In another embodiment, the voltage across the anode and cathode can be adjusted such that gas will form at the anode, e.g., oxygen or chlorine, while hydroxide ions, carbonate ions and bicarbonate ions are produced in the cathode electrolyte and hydrogen gas is generated at the cathode. However, in this embodiment, hydrogen gas is not supplied to the anode. As can be appreciated by one ordinarily skilled in the art, in this embodiment, the voltage across the anode and cathode will be higher compared to the embodiment when a gas does not form at the anode.

With reference to FIGS. 1-3, anion exchange membrane 114 and cation exchange membrane 120 can be conventional ion exchange membranes. Ideally, the membranes should be capable of functioning in an acidic and/or basic electrolytic solution and exhibit high ion selectivity, low ionic resistance, high burst strength, and high stability in an acidic electrolytic solution in a temperature range of 0° C. to 100° C. or higher. In some embodiments a membrane stable in the range of 0° C. to 80° C., or 0° C. to 90° C., but not stable above these ranges may be used. Suitable membranes include a Teflon™-based cation exchange membrane available from Asahi Kasei of Tokyo, Japan. However, low cost hydrocarbon-based cation exchange membranes can also be utilized, e.g., the hydrocarbon-based membranes available from, e.g., Membrane International of Glen Rock, N.J., and USA.

In various embodiments, the cathode compartment 102 is operatively connected to a waste gas treatment system (not illustrated) where the base solution produced in the cathode electrolyte is utilized, e.g., to sequester carbon dioxide contained in the waste gas by contacting the waste gas and the cathode electrolyte with a solution of divalent cations to precipitate hydroxides, carbonates and/or bicarbonates as described in commonly assigned U.S. patent application Ser. No. 12/344,019 filed on Dec. 24, 2008, herein incorporated by reference in its entirety. The precipitates, comprising, e.g., calcium and magnesium hydroxides, carbonates and bicarbonates in various embodiments may be utilized as building materials, e.g., as cements and aggregates, as described in commonly assigned U.S. patent application Ser. No. 12/126, 776 filed on May 23, 2008, supra, herein incorporated by reference in its entirety. In some embodiments, some or all of the carbonates and/or bicarbonates are allowed to remain in an aqueous medium, e.g., a slurry or a suspension, and are disposed of in an aqueous medium, e.g., in the ocean depths.

In various embodiments, the cathode and anode are also operatively connected to an off-peak electrical power-supply system that supplies off-peak voltage to the electrodes. Since the cost of off-peak power is lower than the cost of power supplied during peak power-supply times, the system can utilize off-peak power to produce a base solution in the cathode electrolyte at a relatively lower cost.

In various embodiments, partially desalinated water is produced in the third electrolyte 122 as a result of migration of cations and anions from the third electrolyte to the adjacent anode electrolyte and cathode electrolyte. In various embodiments, the partially desalinated water is operatively connected to a desalination system (not illustrated) where it is further desalinated as described in commonly assigned U.S. patent application Ser. No. 12/163,205 filed on Jun. 27, 2008, herein incorporated by reference in its entirety.

In another embodiment, the system produces an acid, e.g., hydrochloric acid in the anode electrolyte. Thus, in various embodiments, the anode compartment is operably connected to a system for dissolving minerals and waste materials comprising divalent cations to produce a solution of divalent cations, e.g., Ca++ and Mg++. In various embodiments, the divalent cation solution is utilized to precipitate hydroxides, carbonates and/or bicarbonates by contacting the divalent cation solution with the present base solution and a source of carbon dioxide gas as described in U.S. patent application Ser. No. 12/344,019 filed on Dec. 24, 2008, supra, herein incorporated by reference in its entirety. In various embodiments, the precipitates are used as building materials e.g., cement and aggregates as described in commonly assigned U.S. patent application Ser. No. 12/126,776, supra, herein incorporated by reference in its entirety.

With reference to FIG. 2, in various embodiments, the system includes a cathode electrolyte circulating system 126 adapted for withdrawing and circulating cathode electrolyte in the system. In one embodiment, the cathode electrolyte circulating system comprises a first carbon dioxide gas/liquid contactor 128 that is adapted for dissolving carbon dioxide in the circulating cathode electrolyte, and for circulating the electrolyte in the system. In this embodiment, since sufficient carbon dioxide can be dissolved in the electrolyte in the gas/liquid contactor outside of the cathode electrolyte compartment, optionally it may not be necessary to introduce carbon dioxide 109 A in the cathode electrolyte as is illustrated in FIG. 1 and as described above.

In another embodiment as is illustrated in FIG. 3, the cathode electrolyte circulating system comprises a second carbon dioxide gas/liquid contactor 130 that is capable of dissolving carbon dioxide in a portion of the circulating cathode electrolyte 126 without returning this electrolyte to the cathode compartment. In this embodiment, the electrolyte can be used, e.g., in precipitating divalent cation carbonates and/or bicarbonates outside of the cathode compartment. Also, as can be appreciated, since the pH of the cathode electrolyte can be adjusted by withdrawing and/or circulating cathode electrolyte from the system, the pH of the cathode electrolyte compartment can be by regulated by regulating the amount of electrolyte removed from the system through the second carbon dioxide gas/liquid contactor 130.

With reference to FIGS. 1-3, systems 100, 200 and 300 in various embodiments include a hydrogen gas circulating system 118 adapted for circulating hydrogen gas generated at the cathode 110 for oxidation at the anode 114. In various embodiments, the hydrogen gas is operationally connected to an external supply of hydrogen (not shown) to provide hydrogen gas to the anode 114, e.g., at start-up of operations when the hydrogen supply from the cathode is insufficient.

In various embodiments, the system includes a cathode electrolyte withdrawal and replenishing system (not illustrated) capable of withdrawing all of, or a portion of, the cathode electrolyte from the cathode compartment 102. In various embodiments, the system also includes a salt solution supply system (not shown) for providing a salt solution, e.g., concentrated sodium chloride, as the third electrolyte 122. In various embodiments the system includes a gas supply system (not shown) for supplying carbon dioxide gas 109A to the cathode electrolyte. In various embodiments, the system also includes inlet ports (not shown) for introducing fluids into the cells and outlet ports (not shown) for removing fluids from the cells.

As can be appreciated, in various embodiments and with reference to FIG. 1, although the cathode electrolyte is separated from the third electrolyte by the first cation exchange membrane, and the third electrolyte is separated from the anode electrolyte, when a voltage is applied across the anode and cathode, anions in the electrolytes will attempt to migrate towards the anode 114, and cations will attempt to migrate towards the cathode 110 through the cation exchange membrane and the anion exchange membrane.

With reference to FIG. 1, on applying a voltage across the anode and cathode, protons will form at the anode from oxidation of hydrogen gas supplied to the anode, while hydroxide ions and hydrogen gas will form at the cathode electrolyte from the reduction of water, as follows:

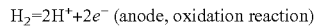

$H_2 = 2H^+ + 2e^-$ (anode, oxidation reaction)

$2H_2O + 2e^- = H_2 + 2OH^-$ (cathode, reduction reaction)

Since protons are formed at the anode from hydrogen gas provided to the anode; and since a gas such as oxygen does not form at the anode; and since water in the cathode electrolyte forms hydroxide ions and hydrogen gas at the cathode, the system will produce hydroxide ions in the cathode electrolyte and protons in the anode electrolyte when a voltage is applied across the anode and cathode.

Further, as can be appreciated, in the present system since a gas does not form at the anode, the system will produce hydroxide ions in the cathode electrolyte and hydrogen gas at the cathode and hydrogen ions at the anode when less than 2V is applied across the anode and cathode, in contrast to the higher voltage that is required when a gas is generated at the anode, e.g., chlorine or oxygen. For example, in various embodiments, hydroxide ions are produced when less than 2.0V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1 V or less is applied across the anode and cathode.

With reference to FIG. 1, on applying a voltage across the anode and cathode, the positively charged protons formed at the anode will attempt to migrate to the cathode through the anode electrolyte, while the negatively charged hydroxide ions formed at the cathode will attempt to migrate to the anode through the cathode electrolyte. As is illustrated in FIG. 1 and with reference to the hydroxide ions in the cathode electrolyte, since the first cation exchange membrane will contain the cathode electrolyte within the cathode compartment, and since the cation exchange membrane will prevent the migration of anions from the cathode electrolyte to the third electrolyte, the hydroxide ions generated in the cathode electrolyte will be prevented from migrating out of the cathode electrolyte through the cation exchange membrane. Consequently, on applying the voltage across the anode and cathode, the hydroxide ions produced at the cathode will be contained in the cathode electrolyte. Thus, depending on the flow rate of fluids into and out of the cathode electrolyte and the rate of carbon dioxide dissolution in the cathode electrolyte, the pH of the cathode electrolyte will adjust, e.g., the pH may increase, decrease or remain the same.

Similarly with reference to protons generated at the anode, under the applied voltage across the cathode and anode, the protons will enter the anode electrolyte and migrate to the anion exchange membrane. However, since the anion exchange membrane will block the movement of cations from the anode electrolyte to the third electrolyte, protons in the anode electrolyte will be prevented from migrating to the third electrolyte. Consequently, on applying the voltage across the anode and cathode, the protons produced at the anode will be contained in the anode electrolyte. Thus, depending on the flow rate of fluids into and out of the anode electrolyte the pH of the anode electrolyte will adjust, e.g., the pH may increase, decrease or remain the same.

With reference to the third electrolyte initially charged with a concentrated solution of sodium ion and chloride ions and is contained in an electrochemical cell by the anion exchange membrane and the cation exchange membrane, on applying a voltage across the anode and cathode, anions in the third electrolyte, e.g., chloride ions, will migrate to the anode, while cations, e.g., sodium ions in the third electrolyte, will migrate to the cathode. Since the anion exchange membrane will allow the migration of anions from the third electrolyte to the anode electrolyte, chloride ions present in the third electrolyte will migrate to the anode electrolyte where they will form an acid, e.g., hydrochloric acid, with the protons from the anode.

Further, since the cation exchange membrane will allow migration of cations from the third electrolyte to the cathode electrolyte, sodium ions present in the third electrolyte will migrate to the cathode electrolyte where they will form sodium hydroxide with the hydroxide ions generated at the cathode. Consequently, as is illustrated in FIG. 1-3, on application of a voltage across the anode and cathode, the cations, e.g., sodium ions, and anions, e.g., chloride ions will migrate out of the third electrolyte, thereby forming desalinated water in the third electrolyte.

In various embodiments and as is illustrated in FIGS. 1-3, hydrogen gas is generated at the cathode from reduction of water in the cathode electrolyte. This gas can be vented from the cathode or directed to the anode where it is oxidized to protons as described herein.

In various embodiments, depending on the ionic species desired in the system, alternative reactants can be utilized. Thus, for example, if a potassium salt such as potassium hydroxide or potassium carbonate is desired in the cathode electrolyte, then a potassium salt such as potassium chloride can be utilized in the third electrolyte 122. Similarly, if sulphuric acid is desired in the anode electrolyte, then a sulphate such as sodium sulphate can be utilized in the third electrolyte 122. Likewise, as described in various embodiments herein, carbon dioxide gas is absorbed in the cathode electrolyte; however, it will be appreciated that other gases including volatile vapors can be absorbed in the electrolyte, e.g., sulfur dioxide, or organic vapors to produce a desired result. As can be appreciated, the gas can be added to the electrolyte in various ways, e.g., by bubbling it directly into the electrolyte, or dissolving the gas in a separate compartment connected to the cathode compartment and then directed to the cathode electrolyte as described herein.

Figure 5:
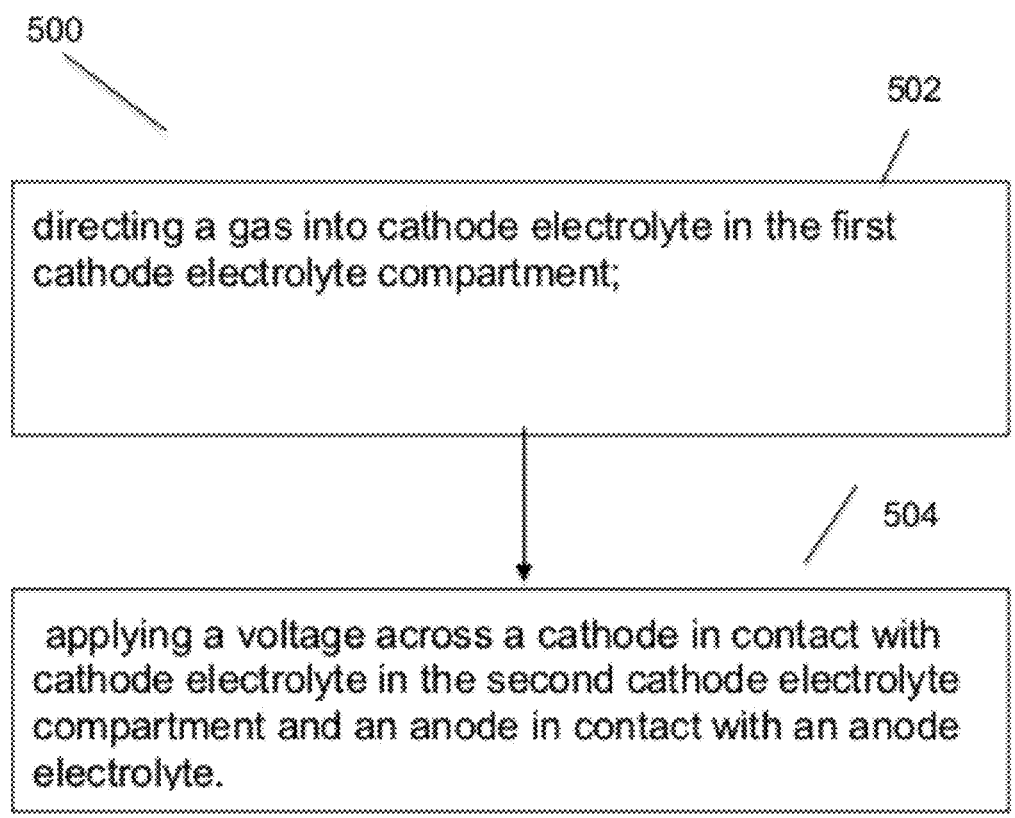
FIG. 5 is a flow chart of an embodiment of the present method.

With reference to FIG. 5, the method 500 comprises a step 502 of directing a gas into cathode electrolyte in a first cathode electrolyte compartment; and a step 504 of applying a voltage across a cathode in contact with cathode electrolyte in a second cathode electrolyte compartment, and an anode in contact with an anode electrolyte, where the first cathode electrolyte is partitioned from the second cathode electrolyte.

In various embodiments the method further includes a step of adding carbon dioxide to the cathode electrolyte; a step of producing carbonic acid, hydroxide ions, carbonate ions and/or bicarbonate ions in the first cathode electrolyte compartment by applying a low voltage as described elsewhere herein, across the anode and cathode; a step of producing carbonate ions and/or bicarbonate ions in the second cathode electrolyte compartment; a step of producing hydrogen gas at the cathode and directing the gas to the anode where it is oxidized to hydrogen ions; a step of producing hydrogen ions at the anode; a step wherein a gas is not produced at the anode on applying the present voltage across the anode and cathode; a step wherein the voltage across the anode and cathode is less than 2V; a step of separating the cathode electrolyte from a third electrolyte by a cation exchange membrane; a step of separating the anode electrolyte from the third electrolyte by an anion exchange membrane; a step wherein the third electrolyte comprises sodium and chloride ions; a step of migrating sodium ions from the third electrolyte to the cathode electrolyte across the cation exchange membrane, and migrating chloride ions from the third electrolyte to the anode electrolyte across the anion exchange membrane; a step wherein the cathode electrolyte comprises sodium carbonate, sodium bicarbonate or sodium hydroxide, and the anode electrolyte comprises hydrochloric acid; a step of producing an acid in the anode electrolyte; a step of utilizing the acid to dissolve a mafic mineral or a cellulose materials; a step of producing partially desalinated water in the third electrolyte; a step comprising processing the partially desalinated water in a water desalination system; a step of contacting the cathode electrolyte with a divalent cation solution to produce divalent cation hydroxide, carbonate and/or bicarbonate compounds; a step wherein the divalent carbonate and/or bicarbonate compounds comprise calcium and magnesium; a step of withdrawing a first portion of the cathode electrolyte; dissolving carbon dioxide in the first portion of cathode electrolyte to produce a first enriched carbonated cathode electrolyte; and replenishing cathode electrolyte with the first enriched carbonated cathode electrolyte; a step of withdrawing a second portion of the cathode electrolyte; dissolving carbon dioxide in the second portion of cathode electrolyte to produce a second enriched carbonated cathode electrolyte; and contacting the second enriched carbonated cathode electrolyte with a divalent cation solution to produce divalent cation carbonates; a step of applying an off-peak electrical power-supply across the cathode and anode to provide the voltage across the anode and cathode.

In various embodiments, hydroxide ions are formed at the cathode and in the cathode electrolyte by applying a voltage of less than 2V across the anode and cathode without forming a gas at the anode, while providing hydrogen gas at the anode for oxidation at the anode. In various embodiments, method 500 does not form a gas at the anode when the voltage applied across the anode and cathode is less than 3V or less, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V or less, 1.5V or less, 1.4V or less, 1.3V or less, 1.2V or less, 1.1V or less, 1.0V or less, 0.9V or less, 0.8V or less, 0.7V or less, 0.6V or less, 0.5V or less, 0.4V or less, 0.3V or less, 0.2V or less, or 0.1 V or less, while hydrogen gas is provided to the anode where it is oxidized to protons. As will be appreciated by one ordinarily skilled in the art, by not forming a gas at the anode and by providing hydrogen gas to the anode for oxidation at the anode, and by otherwise controlling the resistance in the system for example by decreasing the electrolyte path lengths and by selecting ionic membranes with low resistance and any other method know in the art, hydroxide ions can be produced in the cathode electrolyte with the present lower voltages.

In various embodiments, method 500 further comprises a step of directing carbon dioxide gas into the cathode electrolyte; a step of directing carbon dioxide gas into the cathode electrolyte before or after the cathode electrolyte is placed in contact with the cathode; a step of forming hydrogen gas at the cathode; a step of forming protons at the anode; a step of forming a pH differential of 1, 2, 3, 4, 5, 6, 7, 8, 9, 10, 11, 12, 13, 14 pH units or greater between the anode and cathode electrolytes without forming a gas at the anode by selectively applying a voltage of between 3V and 0.5V or less across the anode and the cathode; a step of forming hydroxide ions, bicarbonate ions, carbonate ions and/or a combination thereof in the cathode electrolyte; a step of forming sodium hydroxide, sodium bicarbonate or sodium carbonate in the cathode electrolyte; a step of migrating chloride ions from the third electrolyte across the anion exchange membrane to the anode electrolyte; a step of forming an acid in the anode electrolyte; a step of forming hydrochloric acid in the anode electrolyte; a step of migrating cations from the third electrolyte across a cation exchange membrane to the cathode electrolyte; a step of migrating sodium ions from the third electrolyte across the cation exchange membrane to the cathode electrolyte; a step of directing hydrogen gas formed at the cathode to the anode; and a step of removing cathode electrolyte via an outflow and replenishing cathode electrolyte via an inflow stream to the cathode electrolyte.

As will be appreciated by one ordinarily skilled in the art, by not forming a gas at the anode and by providing hydrogen gas to the anode for oxidation at the anode, hydroxide ions are produced in the cathode electrolyte with the present voltages. In various embodiments, method 500 in conjunction with the system of FIGS. 1-3 further comprises a step of: e.g., applying a voltage across the anode 114 and cathode 110 such that a gas, oxygen or chlorine, is prevented from forming at the anode; a step of forming bicarbonate ions, carbonate ions or a mixture of bicarbonate and carbonate ions in the cathode electrolyte; a step of supplying and oxidizing hydrogen gas at the anode while applying a voltage of 3V, 2.9V, 2.8V, 2.7V, 2.6V, 2.5V, 2.4V, 2.3V, 2.2V, 2.1V, 2.0V, 1.9V, 1.8V, 1.7V, 1.6V, 1.5V, 1.4V, 1.3V, 1.2V, 1.1V, 1.0V, 0.9V, 0.8V, 0.7V, 0.6V, 0.5V, 0.4V, 0.3V, 0.2V, or 0.1 V or less across the cathode and anode and forming hydrogen gas at the cathode; a step of oxidizing hydrogen gas at the anode to form protons at the anode; a step of forming a pH differential of 1, 2, 3, 4, 5, 6, 7, 8, 9, 10, 11, 12, 13, 14 pH units or greater between the anode electrolyte and cathode electrolyte without forming a gas at the anode; a step of forming a pH gradient of pH differential of 1, 2, 3, 4, 5, 6, 7, 8, 9, 10, 11, 12, 13, 14 pH units or greater between the anode electrolyte and cathode electrolyte without forming a gas at the anode; a step of forming sodium carbonate, sodium bicarbonate or mixture of sodium carbonate and sodium bicarbonate in the cathode electrolyte; a step of migrating anions from the third electrolyte across the anion exchange membrane to the anode electrolyte; a step of migrating chloride ions from the third electrolyte across the anion exchange membrane to the anode electrolyte; a step of forming an acid in the anode electrolyte; a step of forming hydrochloric acid in the anode electrolyte; a step of migrating cations from the third electrolyte across the cation exchange membrane 120 to the cathode electrolyte; a step of migrating sodium ions from the third electrolyte across the cation exchange membrane to the cathode electrolyte; a step of directing hydrogen gas formed at the cathode 110 for oxidation at the anode 114; a step of directing at least a portion of the cathode electrolyte from an outflow to an inflow stream of the cathode electrolyte; a step of withdrawing a first portion of the cathode electrolyte, dissolving carbon dioxide in the first portion of cathode electrolyte to produce a first enriched carbonated cathode electrolyte, and replenishing cathode electrolyte with the first enriched carbonated cathode electrolyte; and a step of withdrawing a second portion of the cathode electrolyte, dissolving carbon dioxide in the second portion of cathode electrolyte to produce a second enriched carbonated cathode electrolyte, and contacting the second enriched carbonated cathode electrolyte with a divalent cation solution to produce divalent cation carbonates.

In various embodiments, bicarbonate ions and carbonate ions are produced in the cathode electrolyte where the voltage applied across the anode and cathode is less than 3.0V, 2.9V, 2.8V, 2.V7, 2.6V, 2.5V, 2.4V, 2.3V, 2.2V, 2.1V, 2.0V, 1.9V, 1.8V, 1.7V, 1.6V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1V or less without forming a gas at the anode. In various embodiments, the method is adapted to withdraw and replenish at least a portion of the cathode electrolyte and the acid in the anode electrolyte back into the system in either a batch, semi-batch or continuous mode of operation.

With reference to FIGS. 1-3, when a voltage is applied across the anode and cathode hydroxide ions and/or carbonate and/or bicarbonate ions will form in the in the cathode electrolyte and, consequently the pH of the cathode electrolyte to be adjusted. In one embodiment, the anode and cathode hydroxide ions and/or carbonate and/or bicarbonate ions will form when a voltage across the cathode and anode is 0.1V or less, 0.2V or less. 0.4V or less, 0.6V or less, 0.8V or less, 1.0V or less, 1.5V or less, or 2.0V or less. For example, when a voltage of 0.8V or less is applied across the anode and cathode, hydroxide ions are produced in the cathode electrolyte solution; in another embodiment, when a voltage of 0.01 to 2.5 V, or 0.01V to 2.0V, or 0.1V to 2.0V, or 0.1 to 2.0 V, or 0.1V to 1.5V, or 0.1 V to 1.0V, or 0.1V to 0.8V, or 0.1V to 0.6V, or 0.1V to 0.4V, or 0.1V to 0.2V, or 0.01V to 1.5V, or 0.01 V to 1.0V, or 0.01V to 0.8V, or 0.01V to 0.6V, or 0.01V to 0.4V, or 0.01V to 0.2V, or 0.01V to 0.1V, e.g., or 0.1V to 2.0V is applied across the anode and cathode hydroxide ions are produced in the cathode electrolyte; in yet another embodiment, when a voltage of about 0.1V to 1V is applied across the anode and cathode hydroxide ions are produced in the cathode electrolyte solution increased. Similar results are achievable with voltages of 0.1V to 0.8 V; 0.1V to 0.7 V; 0.1 to 0.6 V; 0.1V to 0.5 V; 0.1V to 0.4 V; and 0.1V to 0.3 V across the electrodes.

In various embodiments, the method and system are capable of producing a pH difference of more than 0.5 pH units between the anode electrolyte solution and a cathode electrolyte solution when the two electrolyte solutions are separated, e.g., by one or more ion exchange membranes, and when a voltage of 3V or less, 2.9 V or less or 2.5 V or less, or 2V or less is applied across the anode and cathode. In some embodiments the method and system are capable of producing a pH difference of more than 1.0 pH units, or 2 pH units, or 4 pH units, or 6 pH units, or 8 pH units, or 10 pH units, or 12 pH units, or 14 pH units between a first electrolyte solution and a second electrolyte solution where the first electrolyte solution contacts an anode and the second electrolyte solution contacts a cathode, and the two electrolyte solutions are separated, e.g., by one or more ion exchange membranes, when a voltage of 0.1V or less is applied across the anode and cathode.

Figure 4:
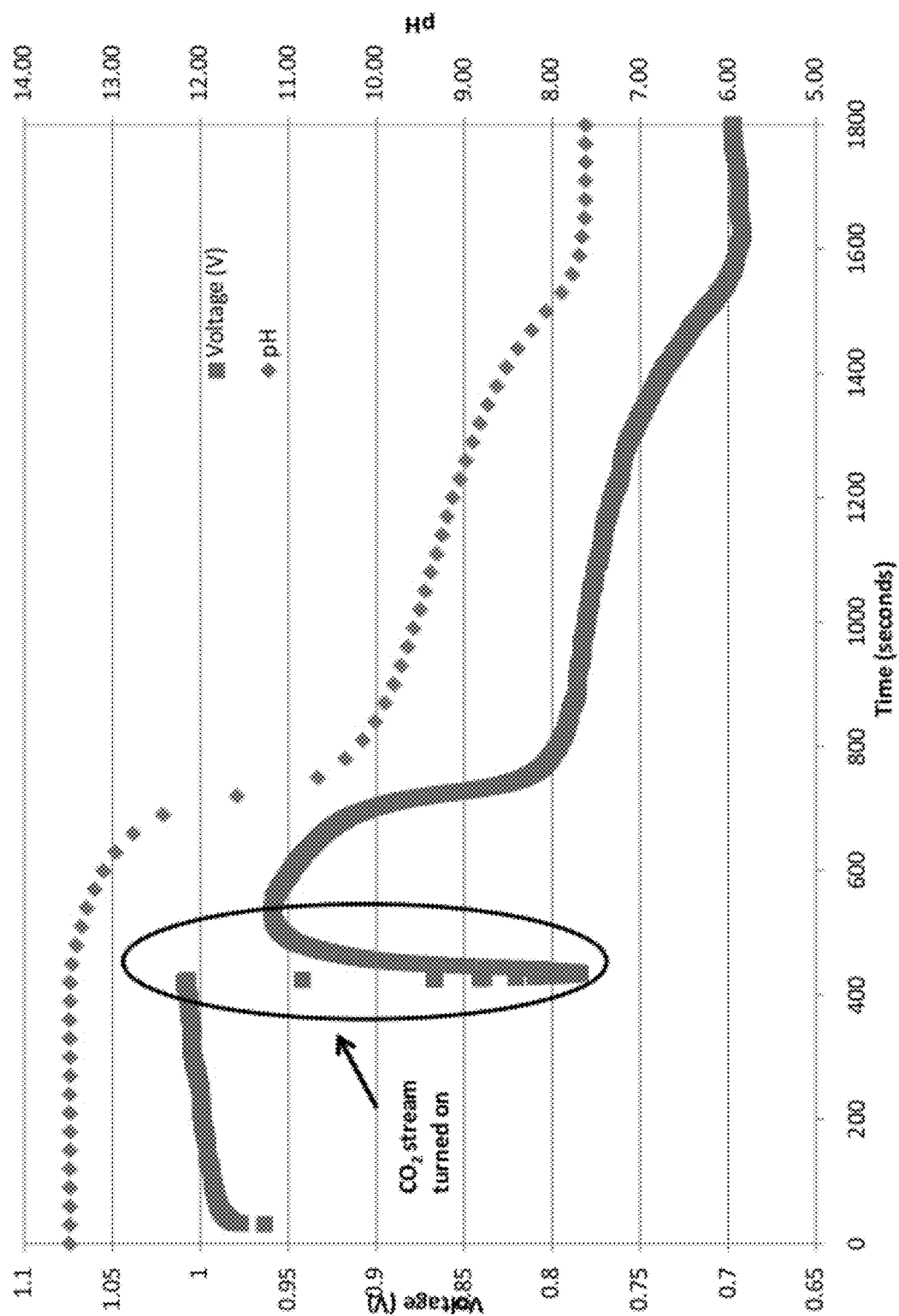
FIG. 4 is an illustration of the voltage across the anode and cathode vs. the pH of the cathode electrolyte achieved by adding $CO_2$ to the cathode electrolyte.

In another exemplary result and with reference to FIG. 4, a system as illustrated in FIG. 1 was configured and operated with constant current density while carbon dioxide gas was continuously dissolved into the cathode compartment. In the system, the pH in the cathode electrolyte and the voltage across the anode and cathode were monitored. In the system, a platinum loaded gas diffusion electrode was utilized as the anode and a nickel mesh was utilized as the cathode. Original cell concentrations were 5 M NaCl, 1 M NaOH and 1 M HCl in the third electrolyte 122, the cathode electrolyte 108 and anode electrolyte 115, respectively. The ionic membranes utilized were obtained from Membrane International, Inc., of NJ, USA, in particular membrane no. AMI 7001 for anion exchange membrane 124, and membrane no. CMI 7000 for cation exchange membrane 120. As can be seen in FIG. 4, as the reaction proceeded, the pH of the cathode electrolyte decreased as carbon dioxide gas was absorbed in the cathode electrolyte. At the same time, the voltage across the anode and cathode also decreased.

As can be appreciated, the solubility of carbon dioxide in the cathode electrolyte is dependent on the pH of the electrolyte, and the voltage across the cathode and anode is dependent on the pH difference between the anode electrolyte and cathode electrolyte. Thus, as is illustrated in FIG. 4, the system can therefore be configured and operated at a specified pH and voltage to absorb carbon dioxide and produce carbonic acid, carbonate ions and/or bicarbonate ions in the cathode electrolyte. Hence, for example, as is illustrated in FIG. 4, the system can be configured and operated at less than 1V across the anode, e.g., at 0.9V to produce a base solution with a pH of 10. In other embodiments, the system can be configured and operated at 0.85V to produce a base solution with a pH of 9. Other operating voltages include voltages in the range of 0.7V to 1V as illustrated in FIG. 4. Similarly, other operating pH values include pH values in the range of 6 to 12. As discussed above, the base solution produced in the cathode electrolyte and comprising carbonate and bicarbonate ions can be utilized with a divalent cation solution to sequester carbon dioxide by precipitating divalent cation carbonate and bicarbonates from the solution.

In some embodiments, divalent cations, e.g., magnesium ions or calcium ions are removed from the cathode electrolyte solution during parts of the process where the cathode and anode electrolytes are in contact with the ion exchange membranes. This is done to prevent scaling of the membranes, if necessary for that particular membrane. Thus, in various embodiments the total concentration of divalent cations in the electrolyte solutions when they are in contact with the ion exchange membrane or membranes for any appreciable time is less than 0.06 mol/kg solution, or less than 0.06 mol/kg solution, or less than 0.04 mol/kg solution, or less than 0.02 mol/kg solution, or less than 0.01 mol/kg solution, or less than 0.005 mol/kg solution, or less than 0.001 mol/kg solution, or less than 0.0005 mol/kg solution, or less than 0.0001 mol/kg solution, or less than 0.00005 mol/kg solution.

In embodiments where carbon dioxide gas is dissolved in the cathode electrolyte, as protons are removed from the cathode electrolyte more carbon dioxide may be dissolved to form carbonic acid, bicarbonate ions and/or carbonate ions.

Depending on the pH of the cathode electrolyte the balance is shifted toward bicarbonate ions or toward carbonate ions, as is well understood in the art and as is illustrated in the carbonate speciation diagram, above. In these embodiments the pH of the cathode electrolyte solution may decrease, remain the same, or increase, depending on the rate of removal of protons compared to rate of introduction of carbon dioxide. It will be appreciated that no carbonic acid, hydroxide ions, carbonate ions or bicarbonate ions are formed in these embodiments, or that carbonic acid, hydroxide ions, carbonate ions, bicarbonate ions may not form during one period but form during another period.

In another embodiment, the present system and method are integrated with a carbonate and/or bicarbonate precipitation system (not illustrated) wherein a solution of divalent cations, when added to the present cathode electrolyte, causes formation of precipitates of divalent carbonate and/or bicarbonate compounds, e.g., calcium carbonate or magnesium carbonate and/or their bicarbonates. In various embodiments, the precipitated divalent carbonate and/or bicarbonate compounds may be utilized as building materials, e.g., cements and aggregates as described for example in commonly assigned U.S. patent application Ser. No. 12/126,776, now U.S. Pat. No. 7,735,274, filed on May 23, 2008, herein incorporated by reference in its entirety.

In an alternative embodiment, the present system and method are integrated with a mineral and/or material dissolution and recovery system (not illustrated) wherein the acidic anode electrolyte solution 115 or the basic cathode electrolyte 102 is utilized to dissolve calcium and/or magnesium-rich minerals e.g., serpentine or olivine, or waste materials, e.g., fly ash, red mud and the like, to form divalent cation solutions that may be utilized, e.g., to precipitate carbonates and/or bicarbonates as described herein. In various embodiments, the precipitated divalent carbonate and/or bicarbonate compounds may be utilized as building materials, e.g., cements and aggregates as described for example in commonly assigned U.S. patent application Ser. No. 12/126,776, now U.S. Pat. No. 7,735,274, filed on May 23, 2008, herein incorporated by reference in its entirety.

In an alternative embodiment, the present system and method are integrated with an industrial waste gas treatment system (not illustrated) for sequestering carbon dioxide and other constituents of industrial waste gases, e.g., sulfur gases, nitrogen oxide gases, metal and particulates, wherein by contacting the flue gas with a solution comprising divalent cations and the present cathode electrolyte comprising hydroxide, bicarbonate and/or carbonate ions, divalent cation carbonates and/or bicarbonates are precipitated as described in commonly assigned U.S. patent application Ser. No. 12/344,019, now U.S. Pat. No. 7,887,694, filed on Dec. 24, 2008, herein incorporated by reference in its entirety. The precipitates, comprising, e.g., calcium and/or magnesium carbonates and bicarbonates in various embodiments may be utilized as building materials, e.g., as cements and aggregates, as described in commonly assigned U.S. patent application Ser. No. 12/126,776, now U.S. Pat. No. 7,735,274, filed on May 23, 2008, herein incorporated by reference in its entirety.

In another embodiment, the present system and method are integrated with an aqueous desalination system (not illustrated) wherein the partially desalinated water of the third electrolyte of the present system is used as feed-water for the desalination system, as described in commonly assigned U.S. patent application Ser. No. 12/163,205, now U.S. Pat. No. 7,744,761, filed on Jun. 27, 2008, herein incorporated by reference in its entirety.

In an alternative embodiment, the present system and method are integrated with a carbonate and/or bicarbonate solution disposal system (not illustrated) wherein, rather than producing precipitates by contacting a solution of divalent cations with the first electrolyte solution to form precipitates, the system produces a slurry or suspension comprising carbonates and/or bicarbonates. In various embodiments, the slurry or suspension is disposed of in a location where it is held stable for an extended periods of time, e.g., the slurry/suspension is disposed in an ocean at a depth where the temperature and pressure are sufficient to keep the slurry stable indefinitely, as described in U.S. patent application Ser. No. 12/344,019, now U.S. Pat. No. 7,887,694, filed on Dec. 24, 2008, herein incorporated by reference in its entirety.

While preferred embodiments of the present invention have been illustrated and described herein, it will be obvious to those skilled in the art that such embodiments are provided by way of example only and not by limitation. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. An electrochemical system comprising:
  (a) a cathode compartment comprising a cathode electrolyte in contact with a cathode, wherein the cathode produces hydrogen gas, and wherein the cathode compartment is operatively connected to a system selected from an industrial waste gas system that delivers carbon dioxide derived from combusting fossil fuels or cement plants to the cathode compartment; a gas/liquid contactor operatively connected to the industrial waste gas system wherein the gas/liquid contactor contacts the cathode compartment with carbon dioxide from the industrial waste gas system; or combination thereof;
  (b) an anode compartment comprising an anode electrolyte in contact with an anode;
  (c) the cathode electrolyte comprising bicarbonate ions wherein the anode electrolyte and the cathode electrolyte have a pH differential of between 6-12;
  (d) a hydrogen gas delivery system configured to direct hydrogen gas from the cathode to the anode; and
  a Nernst cell voltage of less than 0.8V across the anode and the cathode.

2. The system of claim 1, wherein the system is configured to absorb the carbon dioxide gas into the cathode electrolyte, and further wherein the cathode electrolyte comprises hydroxide ions, carbonic acid, carbonate ions, or any combination thereof.

3. The system of claim 1, wherein the cathode compartment is partitioned into a first cathode electrolyte compartment and a second cathode electrolyte compartment by a partition such that on placing the cathode electrolyte in the cathode compartment, there is a liquid flow between the cathode electrolyte in the first cathode electrolyte compartment and the cathode electrolyte in the second cathode electrolyte compartment and wherein the carbon dioxide gas is isolated from the cathode electrolyte in the second cathode electrolyte compartment such that the carbon dioxide gas is prevented from contacting the cathode.

4. The system of claim 1, wherein the system is configured to produce hydroxide ions in the cathode electrolyte with less than 0.6V across the anode and cathode.

5. The system of claim 1, wherein the system does not produce a gas at the anode.

6. The system of claim 3, wherein the system is configured to migrate hydroxide ions from the second cathode electrolyte compartment to the first cathode electrolyte compartment.

7. The system of claim 1, wherein the cathode compartment is operatively connected to a hydroxide, carbonate and/or bicarbonate precipitation system, wherein the precipitation system is configured to utilize the cathode electrolyte to produce hydroxide, divalent cation carbonates and/or divalent cation bicarbonate.

8. The system of claim 1, further comprising at least one ion exchange membrane between the anode compartment and the cathode compartment.

9. The system of claim 8, wherein the at least one ion exchange membrane comprises a cation exchange membrane separating the cathode electrolyte from a third electrolyte, an anion exchange membrane separating the anode electrolyte from the third electrolyte, or both the cation exchange membrane separating the cathode electrolyte from a third electrolyte and the anion exchange membrane separating the anode electrolyte from the third electrolyte.

10. The system of claim 9, wherein the third electrolyte comprises sodium ions and chloride ions and wherein the system is configured to migrate the sodium ions from the third electrolyte to the cathode electrolyte through the cation exchange membrane, and migrate the chloride ions from the third electrolyte to the anode electrolyte through the anion exchange membrane, and further wherein the system is configured to produce hydrochloric acid in the anode electrolyte.

11. The system of claim 10, wherein the system is configured to produce sodium hydroxide, sodium carbonate and/or sodium bicarbonate in the cathode electrolyte and partially desalinated water in the third electrolyte.

12. The system of claim 1, wherein the gas/liquid contactor comprises the cathode electrolyte withdrawn from the cathode compartment that is contacted with the carbon dioxide from the industrial waste gas system.

13. The system of claim 12, wherein the cathode electrolyte comprising carbon dioxide is returned to the cathode compartment.

14. An electrochemical method comprising:
contacting an anode electrolyte with an anode in an anode compartment wherein the anode oxidizes hydrogen gas to hydrogen ions;
contacting a cathode electrolyte with a cathode in a cathode compartment wherein the cathode produces hydroxide ions and hydrogen gas;
directing hydrogen gas produced at the cathode to the anode;
directing an industrial waste gas comprising carbon dioxide into the cathode electrolyte in the cathode compartment or directing carbon dioxide into the cathode electrolyte from a gas/liquid contactor that is in contact with an industrial waste gas;
converting bicarbonate ions to carbonate ions in the cathode electrolyte and producing a pH differential between the anode electrolyte and the cathode electrolyte of between 6-12; and
applying a Nernst cell voltage of less than 0.8V across the cathode and the anode.

15. The method of claim 14, comprising producing hydroxide ions, carbonic acid, carbonate ions, and/or bicarbonate ions in the cathode electrolyte.

16. The method of claim 14, wherein the voltage applied across the anode and the cathode is less than 0.6V.

17. The method of claim 15, further comprising producing hydrogen ions at the anode wherein a gas is not produced at the anode.

18. The method of claim 14, further comprising separating the cathode electrolyte from a third electrolyte by a cation exchange membrane, separating the anode electrolyte from the third electrolyte by an anion exchange membrane, or both.

19. The method of claim 18, wherein the third electrolyte comprises sodium ions and chloride ions.

20. The method of claim 19, further comprising migrating the sodium ions from the third electrolyte to the cathode electrolyte across the cation exchange membrane, and migrating the chloride ions from the third electrolyte to the anode electrolyte across the anion exchange membrane, producing an acid in the anode electrolyte, and producing sodium carbonate, sodium bicarbonate or sodium hydroxide in the cathode electrolyte.

21. The method of claim 20, further comprising contacting the cathode electrolyte with a divalent cation solution to produce divalent cation hydroxide, carbonate and/or bicarbonate compounds, wherein the divalent carbonate and/or bicarbonate compounds comprise calcium, magnesium, or both calcium and magnesium.

* * * * *